(12) United States Patent
Chen et al.

(10) Patent No.: US 11,051,137 B2
(45) Date of Patent: *Jun. 29, 2021

(54) LOCAL AND TEMPORAL METHOD AND SYSTEM OF BROADCASTING VIA PEER-TO-PEER NETWORK

(71) Applicant: LOUD-HAILER, INC., Kerhonkson, NY (US)

(72) Inventors: Jack Chen, Kerhonkson, NY (US); Cimon Butler, Kerhonkson, NY (US); Luca Cozza, Upper Nyack, NY (US); Sumit Kumar, Noida (IN); Alok Upadhyay, Ghaziabad (IN); Subhash Chand, Noida (IN)

(73) Assignee: Loud-Hailer, Inc., Kerhonkson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,824

(22) Filed: Sep. 25, 2019

(65) Prior Publication Data
US 2020/0128365 A1    Apr. 23, 2020

Related U.S. Application Data

(63) Continuation of application No. 15/529,257, filed as application No. PCT/US2015/062304 on Nov. 24, 2015, now Pat. No. 10,448,219.
(Continued)

(51) Int. Cl.
*H04W 4/08* (2009.01)
*H04W 4/80* (2018.01)
(Continued)

(52) U.S. Cl.
CPC ............... *H04W 4/08* (2013.01); *H04W 4/06* (2013.01); *H04W 4/80* (2018.02); *H04W 12/08* (2013.01);
(Continued)

(58) Field of Classification Search
CPC ......... H04W 4/08; H04W 4/80; H04W 84/20; H04W 4/008
See application file for complete search history.

(56) References Cited

U.S. PATENT DOCUMENTS 4,698,783 A    10/1987  Nishimuro et al.
9,049,537 B2   6/2015   Shalunov et al.
(Continued)

FOREIGN PATENT DOCUMENTS

JP    2001-249872 A    9/2001
JP    2001-325200 A    11/2001
(Continued)

OTHER PUBLICATIONS

Kurebayashi, Kaoru, Introduction! The missions of Bluetooth, Interafce, vol. 39, No. 5, Japan, CQ Publishing Co., Ltd., May 1, 2013, pp. 26-33.
(Continued)

*Primary Examiner* — Dong-Chang Shiue
(74) *Attorney, Agent, or Firm* — Gottlieb Rackman & Reisman PC

(57) ABSTRACT

A method and system for distributed messaging between a plurality of computer devices using a short range wireless communication protocol (SRWP) is disclosed. The communication protocol can be one in which slave devices provide data to master devices. A device automatically establishes master and slave connections with other devices via the protocol as they come into range. A user-entered message is displayed on the device and broadcast by the device over slave connections to other connected devices. Messages received by the device over its master connections are displayed and also rebroadcast to other connected devices. Messages can be displayed for a limited time period during which they fade or otherwise are altered to provide a visual indication of the display lifetime remaining for that mes-
(Continued)

sage. A relay can be provided to receive an rebroadcast messages to connected devices and inject into the SRWP network from devices outside the network.

31 Claims, 12 Drawing Sheets

Related U.S. Application Data

(60) Provisional application No. 62/243,972, filed on Oct. 20, 2015, provisional application No. 62/193,461, filed on Jul. 16, 2015, provisional application No. 62/084,342, filed on Nov. 25, 2014.

(51) Int. Cl.
*H04W 12/08* (2021.01)
*H04W 4/06* (2009.01)
*H04W 12/50* (2021.01)
*H04W 4/029* (2018.01)
*H04W 84/20* (2009.01)
*H04L 29/06* (2006.01)

(52) U.S. Cl.
CPC ............ *H04W 12/50* (2021.01); *H04L 63/104* (2013.01); *H04W 4/029* (2018.02); *H04W 84/20* (2013.01)

(56) References Cited

U.S. PATENT DOCUMENTS

| 9,113,309 | B2 | 8/2015 | Uilecan et al. | |
|---|---|---|---|---|
| 2003/0117316 | A1* | 6/2003 | Tischer | H04W 4/029 |
| | | | | 342/357.66 |
| 2004/0203378 | A1 | 10/2004 | Powers | |
| 2005/0163135 | A1 | 7/2005 | Hopkins | |
| 2006/0036740 | A1* | 2/2006 | Hagale | G06Q 10/107 |
| | | | | 709/227 |
| 2008/0013546 | A1 | 1/2008 | Bhatt et al. | |
| 2010/0049846 | A1 | 2/2010 | Ballette et al. | |
| 2012/0328061 | A1* | 12/2012 | Chow | H04W 4/80 |
| | | | | 375/354 |
| 2013/0337739 | A1* | 12/2013 | Bernsen | H04W 12/04 |
| | | | | 455/7 |
| 2014/0250204 | A1 | 9/2014 | Shalunov et al. | |
| 2015/0289081 | A1* | 10/2015 | Chen | H04W 8/005 |
| | | | | 455/41.2 |

FOREIGN PATENT DOCUMENTS

| JP | 2002-342264 A | 11/2002 | | |
|---|---|---|---|---|
| JP | 2004-5256 A | 1/2004 | | |
| KR | 101013618 A | 1/2011 | | |
| WO | WO-2008085133 A1 * | 7/2008 | ............ | G06F 16/40 |
| WO | 2013/149380 | 10/2013 | | |
| WO | WO-2016080798 A1 * | 5/2016 | ......... | H04W 12/003 |
| WO | 2008/085133 | 7/2018 | | |

OTHER PUBLICATIONS

Tsujimi, Yasuhi, The whole picture of the microcomputer program which controls and a Bluetooth dongle, Interafce, vol. 39, No. 5, Japan, CQ Publishing Co., Ltd., May 1, 2013, pp. 97-112.
Japanese Patent Office, Decision to Grant a Patent, issued in corresponding Japanese Patent Application No. 2017-526973, dated Jan. 14, 2020.
International Search Report and Written Opinion, US Patent and Trademark Office, Application No. PCT/US2015/062304, dated Jan. 29, 2016.
"Specification of the Bluetooth System", Bluetooth, Covered Core Package Version 4.1, excerpts, Dec. 3, 2013.
Robert Davidson et al.; "Getting Started with Bluetooth Low Energy", O'Reilly Media, Inc.; May 2014.
Tom Simonite; "The Latest Chat App for iPhone Needs No Internet Connection", MIT Technology Review; Mar. 28, 2014.
"Serval Mesh"; http://developer.servalproject.org/dokuwiki/doko.php?id=content:servalmesh:main_page#current_documentation;downloaded Aug. 10, 2015.
"What is IBeacon? A Guide to Beacons"; iBeacon.com; downloaded Jul. 15, 2015.
"Blueee! Blutooth Instant Messenger", http://www.blueeee.com/, downloaded Aug. 10, 2015.
"FireChat"; Open Garden, Inc., printed from Apple App Store, Mar. 3, 2015.

* cited by examiner

LOCAL AND TEMPORAL METHOD AND SYSTEM OF BROADCASTING VIA PEER-TO-PEER NETWORK

CROSS-REFERENCE TO RELATED APPLICATIONS

This application is a continuation of U.S. application Ser. No. 15/529,257 filed on May 24, 2017 which is a National Stage Entry of PCT/US15/62304 filed on Nov. 24, 2015 and claims benefit of U.S. provisional application Ser. No. 62/243,972 filed on Oct. 20, 2015, U.S. provisional application Ser. No. 62/193,461 filed on Jul. 16, 2015, and U.S. Provisional application Ser. No. 62/084,342 filed on Nov. 25, 2014. The entire contents of each is expressly incorporated by reference.

FIELD OF THE INVENTION

The present invention relates to a method of broadcasting digital message content locally and temporally via a peer-to-peer network created by computer devices (such as mobile devices (e.g., cellphones, including smartphones, and tablet computers)) within a geographically limited area via a short range wireless hardware protocol intended to transmit data over a limited distance, such as about 100 meters or less.

BACKGROUND

Messaging applications that allow users to send short messages to each other over mobile computing devices are increasingly popular. A very common messaging application is the text messaging functionality provided with conventional cell phones. Text messaging allows users to send messages of limited size to one or more designated recipients. Current messaging applications between two or more computers (including mobile devices, such as smart phones and laptops) generally require satisfying one or both of the following conditions in order for messages to transmit successfully. First, the device must be connected to the Internet or the phone (cell) network. Second, at least one of the users must know the identity of another user. Thus, for example, in a one-to-one messaging application, each user must have the unique user identifier (e.g., phone number or user ID) of the other. For a one-to-many messaging application such as Twitter™, the user who is receiving the messages (e.g., the followers) must know the identity of the broadcaster from whom they wish to receive the messages. Neither of these solutions are well suited for sending messages to a group of people who are in a common geographic area but whose identities may not be known in advance.

Various messaging applications have been written to run on mobile devices, such as those using the Apple iOS™ or the Google Android™ operating systems. These applications, such as Facebook Messenger™, Twitter™, and Snapchat™, send messages over an Internet connection, provided either over a WiFi connection to the Internet, a hard-wired Internet link, or using a cellular network. However, if there is no Internet connection, the systems do not operate. Even if there is a WiFi hotspot available, a user must still manually connect to the hotspot router and that router must then be connected to the Internet.

Some consideration has been given to developing messaging software that allows communication between devices without an Internet or cellular connection by using the WiFi and Bluetooth communication hardware present in commercially available smart devices to connect devices in a mesh network. One such application is FireChat™, developed by Open Garden, and which uses a combination of Bluetooth and WiFi.

A drawback present in Bluetooth wireless technology, and various other wireless technologies as well, is that some type of user intervention is typically required for two devices to be paired or tethered with each other before they can communicate. Generally, a user of one device generally must make it 'discoverable' to outside devices and a user of the other device must enter a security code to verify the connection is to be made. As a result, it can be difficult and time consuming to add users to a local mesh network based on Bluetooth. One partial solution to this is set forth in Open Garden's U.S. Pat. No. 9,049,537. A list of the hardware MAC addresses and other information about known devices in the system is collected and then distributed in advance to devices that may need to connect to the network. This information is then used to send directed messages to potential target devices requesting a connection without the target device having to make itself discoverable. A problem with this method is that before a new device can join the network, that device must retrieve, through a separate network connection such as the Internet, the previously collected MAC information about the known devices.

SUMMARY

The present invention is directed to methods and systems for providing distributed messaging of digital content between a plurality of different users via a short range wireless network protocol (SRWP).

Users install an appropriate communication application (app) software on a computing device, such as a mobile phone, tablet, PC or other device that supports the SRWP. The app, functioning as described herein, allows users to communicate with each other using their mobile device like a walkie-talkie, sending messages from their device directly or indirectly to the devices of others nearby without having to use cell reception, Wi-Fi, an Internet connection, or other long range network connections.

Preferably, the wireless protocol is one in which two devices can automatically establish a data communication path without requiring manual input from the user and where the wireless protocol allows a device to communicate with a plurality of other devices. When two devices are running the application and come within range of each other, the app software on each device creates a data connection between them, preferably without requiring specific user intervention authorizing or approving the specific pairing of the devices, as opposed to connections in which devices need to be paired in advance and approved by the user, such as by entering a pairing code.

In a preferred embodiment, a wireless communication protocol is used in which slave devices provide data to master devices and where a device can function as a master device and as a slave device. In a particularly preferred embodiment, the wireless network protocol is Bluetooth Low Energy (BLE), which has a range of about 250 feet. While BLE is preferred, other short range and longer range network protocols may also be suitable for use to implement various embodiments and aspects of the invention.

According to the BLE protocol, a device can operate as either a master (central) device or a slave (peripheral) device. To establish a BLE data connection between two devices, a slave device transmits advertising messages indicating that it is available for a connection. A central device scans for advertising packets. When an advertising packet from a suitable slave device is detected, the master device sends a connection request packet to the slave and, provided the slave responds appropriately, establishes a data connection.

According to aspects of the invention in which BLE or a similar short range wireless protocol is used, a computing device establishes slave connections with a first set of devices, for example, by periodically broadcasting advertising packets and connecting to those master devices that send a connection request message in response. These connections are used by the computing device to send message data. The computing device also establishes one or more master connections with a second set of devices by scanning for advertising messages and, when one is received, sending a connection request message to the respective slave device if no master connection to that device already exists. The master connections (which are slave connections from the viewpoint of the other device) are used by the computing device to receive message data. Typically, a given computing device will establish two connections over the wireless protocol with each device within range: a master connection and a slave connection. However, there may be some circumstances in which two devices only have a single master-slave connection.

Each device can connect to multiple other devices to send and/or receive data. When so connected, the devices form a peer-to-peer mesh communication network. When a user of a first device sends a message, such as a text message of less than or equal a maximum length or a larger message that may need to be broken into chunks for transmission, the app can transmit that message from the first device to each of the other devices to which the first device is connected as a data source. A second device that receives the message will display it, such as in a scrollable window for messages, and also rebroadcast that message to one or more other devices to which it is connected, via the app, as a data source. These other devices also display and rebroadcast the message. As this process continues, the message is propagated across the devices in the network.

Received messages can have a corresponding display lifetime, such as 5 minutes from receipt or first display, and a message is preferably displayed only during its lifetime, after which it is removed from the display. In one embodiment, all messages have a fixed common lifetime. Alternatively, different classes of messages can have different lifetimes. According to a particular aspect of the invention, a visual attribute of a displayed message, such as its color, contrast, transparency, size, or typeface, is varied over the message's lifetime to provide a visual indication of the remaining lifetime of that message. In a specific embodiment, the transparency or contrast relative to the background of a respective displayed incoming message is adjusted over the display lifetime of the message so that the message as displayed appears to slowly fade over time, disappearing when its lifetime expires. A message's lifetime can expire regardless of whether or not a user has actually seen the message content (for example, because the message has scrolled off the visible screen).

A device that receives a message (either as user input to that device or as a forwarded message from another device) can repeatedly rebroadcast that message for a specified period of time or number of rebroadcasts to the other devices to which it is connected, for example rebroadcasting the message every 30 seconds for 5 minutes. In addition to automatically rebroadcasting a newly received message, a user can be permitted to manually signal that a given message should be rebroadcast even if its initial rebroadcast window is closed.

A device receiving a duplicate of a message it has already received and processed in some predefined prior period of time, such as 24 hours, can discard the duplicate instead of processing it, although it can continue to rebroadcast the original if within the rebroadcast period of time for that message. A device can remember a message for longer than it is displayed. As such, for example, a message can have a display lifetime of 10 minutes but a duplicate of that message can be rejected even it arrives hours later.

In one embodiment, the amount of content in a message is limited by the amount of data that can be included in a single data communication transaction under the given protocol. When so limited, messages preferably comprise a small amount of text content combined with limited amounts of meta-data, such as the ID of originating user and originating message time stamp or a message ID. Other meta-data can also be included, such as an image icon or other profile data related to the party who originated the message, information about the device sending or resending the message, GPS data, a unique message ID, etc. Some of this information can also be displayed to a receiving user along with the message itself.

In a further embodiment, longer messages are sent and resent by dividing the initial message into chunks of a size suitable to be sent in a single data communication transaction. Each of the chunks is sent to the connected devices to which data should be directed and receiving devices reassemble chunks.

According to aspects of the invention, messages can be sent among users of a smart device using a low-power, short range wireless communication protocols, using only that protocol and without use of an Internet, WiFi, or cellular network for communication (apart from any connections required to download the app software in the first place). However, according to a further aspect of the invention, a remote Internet connection from a mobile device to a server can be exploited to provide additional functionality. In one embodiment, the user's profile is stored on a remote server. Initial user registration and profile updates can be executed via a web-page interface to a server. User PIN numbers can be reset, etc.

In addition, users can be placed into defined groups. Displayed messages can be filtered based on whether the message is restricted to users in a specified group. If a message is group-limited, it may be shown in an appropriate display window for that group. Defining and maintaining group membership may also be efficiently done through use of a centralized server-based management program.

According to a further embodiment of the invention, different types of messages can be sent. In addition to conventional 'text' messages, for example, a message can be designated as information request message. The processing of information request messages depends in part on the type of information being requested and the purpose for the request. A device receiving an information request message can rebroadcast the information request message and also generate and broadcast its own responsive message containing the requested information. The device from which the request message originated could then collect information from responsive messages that it receives over a period of time and use the returned data as appropriate. In a particular embodiment, the information request message comprises a location request. The returned location data could then be used to show the location of the various responding devices relative to the requesting device, such as in a sonar or radar-type display. The relay itself can also have a GPS device for location based purposes, a feature that may be particularly useful if the relay is mounted in a mobile structure such as a bus, train, ship, or airplane.

According to a further aspect of the invention, a relay device can be provided that can communicate with user devices using various aspects of the communication methods and systems of the invention via the SRWP, such as via BLE. A relay can be a stand-alone device that can be positioned throughout a region where users may be communicating, such as in buildings, outdoor facilities, or in underground areas. The relay would minimize the possibility of the peer-to-per network being broken by receiving messages sent from other devices and then rebroadcasting them. The relay can include a higher power transceiver than typical mobile devices and so allow for extended range. It can be configured to rebroadcast messages for a longer period of time then would normally be done by a user device to ensure message receipt by all users.

A relay can also connect to a remote data source through a secondary data connection, such as a wired or wireless internet connection or cellular modem, to allow for additional messaging functionality and management. Among such additional message functionality is the ability to provide the relay, through the secondary data connection, with one or more messages to be injected into a mesh communication network established between devices according to aspects of the invention addressed herein. The messages can be broadcast upon receipt by the relay or they can be stored in a message library along with additional data, such as trigger conditions indicating when the relay should inject the message into the network, under what local and external conditions, and to which classes/groups of devices. Likewise, the relay can receive messages from nearby users and store them for rebroadcast to other users who approach the relay in the future. For example, an administrator connecting to the relay over the Internet, a cell phone, or other a secondary data network can instruct the relay to send a location request message to the users in the SRWP network encompassing the relay, collect the identity and location of the responding devices, and then return that information. The administrator can also connect to the relay and retrieve other information which may be stored by the relay.

The relay can be powered through the power grid at the installation location. The relay can also include a battery which is engaged if external power fails. A relay can also be configured to perform predefined tasks in a power failure or other designated condition. For example, when a loss of power is detected at a relay, the relay can send a or location request message to the users in the SRWP network encompassing the relay, collect the identity and location of the responding devices, and then forward that information to an administrator.

In addition to supporting SRWP connections and one or more secondary data connections, the relay can also have local data ports, such as USB, ports, to which peripheral devices can be attached. These devices can include sensors, such as temperature, humidity, or pressure gauges, as well as other devices such as cameras, audio recorders, and thermostats. The relay can be programmed to monitor the data from such peripheral devices and send a message to nearby users when determined conditions are detected. For example, a message can be sent upon detection of a sudden change in environmental conditions. (Such peripheral devices can alternatively be themselves programmed to communicate directly over the mesh network if they can support communication over BLE or other SRWP.)

DESCRIPTION OF THE DRAWINGS

Further features and advantages of the invention, as well as structure and operation of various implementations of the invention, are disclosed in detail below with references to the accompanying drawings.

DETAILED DESCRIPTION

The following disclosure addresses various methods and systems for distributed messaging between a plurality of smart computer devices using a short range wireless communication protocol (SRWP). Preferably, the SRWP is one in wherein in a communication link between two devices, one device operates as a slave device which provides data and the other device operates as a master device which receives data. A preferred SRWP is the Bluetooth Low Energy (BLE) protocol described in, e.g., the Bluetooth SIG's Bluetooth Specification Version 4.1, at Vol. 6. However, other versions of BLE may be suitable use with various aspects of the invention, as well as other SRWPs known to those of skill in the art.

Figure 1:
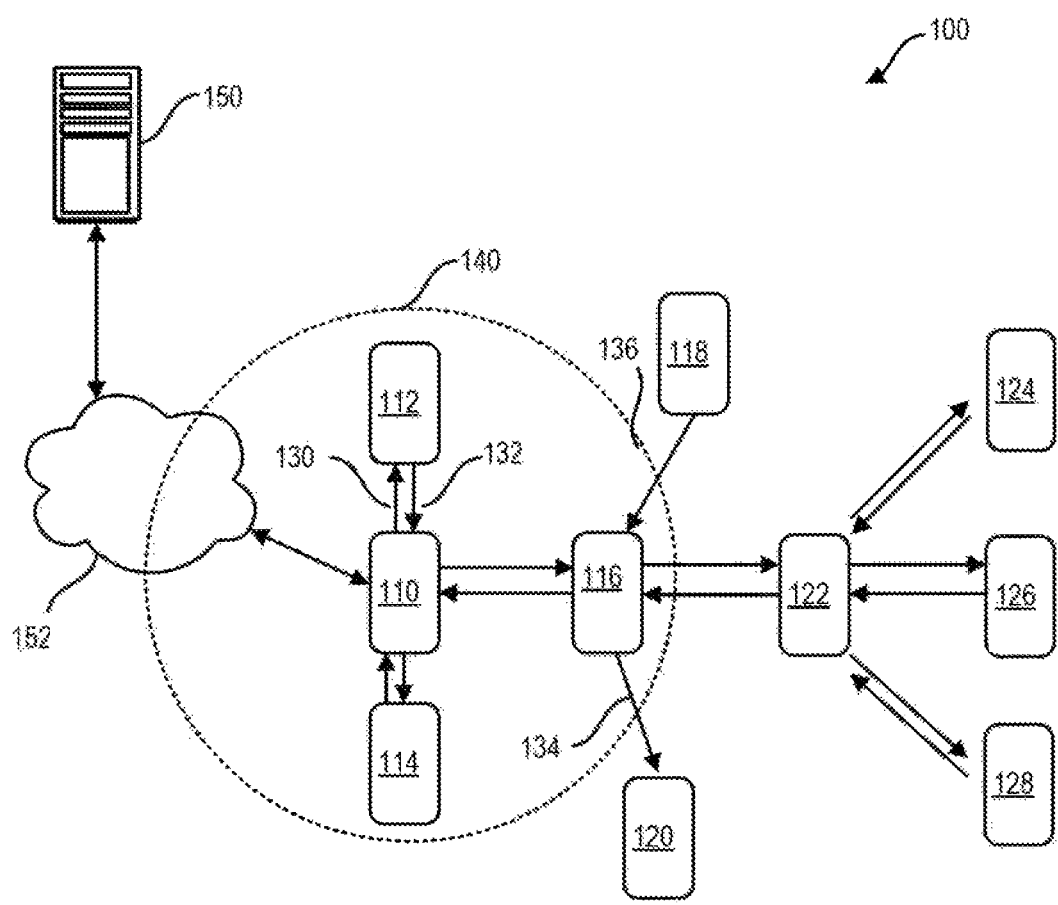
FIG. 1 is a high level diagram of a network of devices connected according to aspects of the invention.

FIG. 1 is a high level diagram of a system 100 in which various computing devices 110-128 are connected to each other using SRWP links to form a distributed messaging network. Each device can directly communicate with other devices within range of the SRWP transceiver, such as about 250 feet. As shown, the SWRP transceiver in device 110 has a range indicated by circle 140 and communication links have been established between (i) device 110 and (ii) the devices 112, 114, 116 within range 140. Each other devices has also established data links using the SRWP with one or more in-range devices. The combined links between the various devices 110-128 form a mesh network.

The computing devices can selected from a variety of suitable devices, such as smart phones, tablets, laptop computers, and other computing devices which can communicate using the SRWP and, preferably, have a display and a user input mechanism (such as a keyboard or touchscreen).

One exemplary, but non-limiting, device well suited for use with the present invention is an iPhone running the Apple iOS 7.0 or later.

Figure 2:
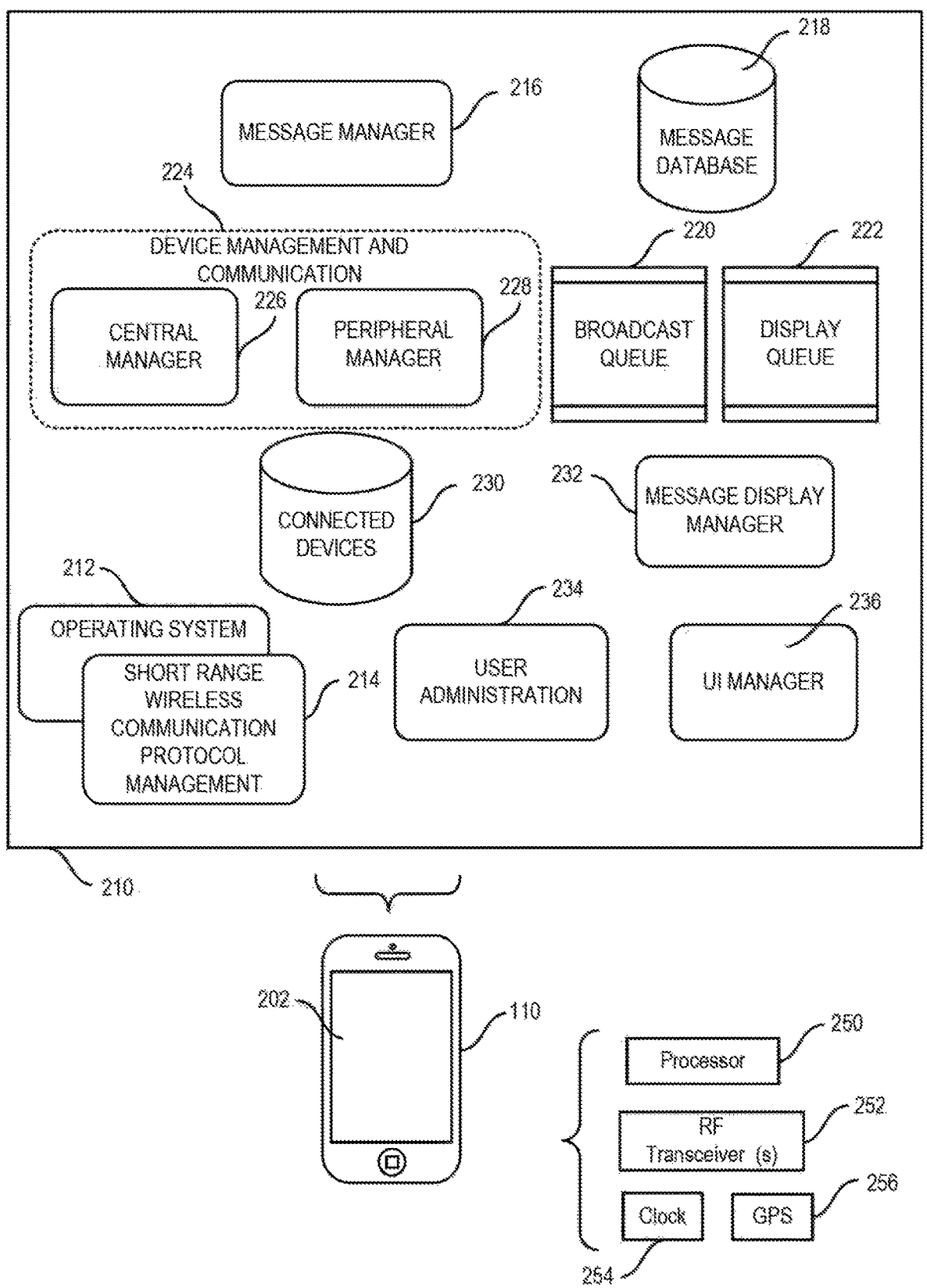
FIG. 2 is a block diagram of exemplary software and data elements implementing aspects of the invention.

FIG. 2 is a high level block diagram of an example computing device 110. Device 110 has a display and a user input mechanism, such as a touchscreen display 202. Device 110 also has RAM and/or RAM memory 210 and various conventional internal hardware components. These components include a processor 250 and RF communication transceiver(s) 252 supporting at least the SRWP and optionally other protocols, such as WiFi and cellular communications. Other conventional elements, such as a clock 254 and GPS unit 256 can also be provided.

FIG. 2 also illustrates various software and data modules in the RAM and/or RAM memory 210 of device 110 and which can be used in an implementation of a particular embodiment of the invention. The device 110 also includes conventional software such as the device's operating system 212 and the various protocol stack layers 214 implementing the SRWP and through which applications can send and receive messages using the SRWP. While a particular division of the various software functions according to one implementation of the invention is illustrated and discussed herein, functionality can also be distributed in various other ways. For example, certain functionality related to initiating a rebroadcast of a message and of managing a message lifetime can be implemented within the message objects themselves.

Figure 3:
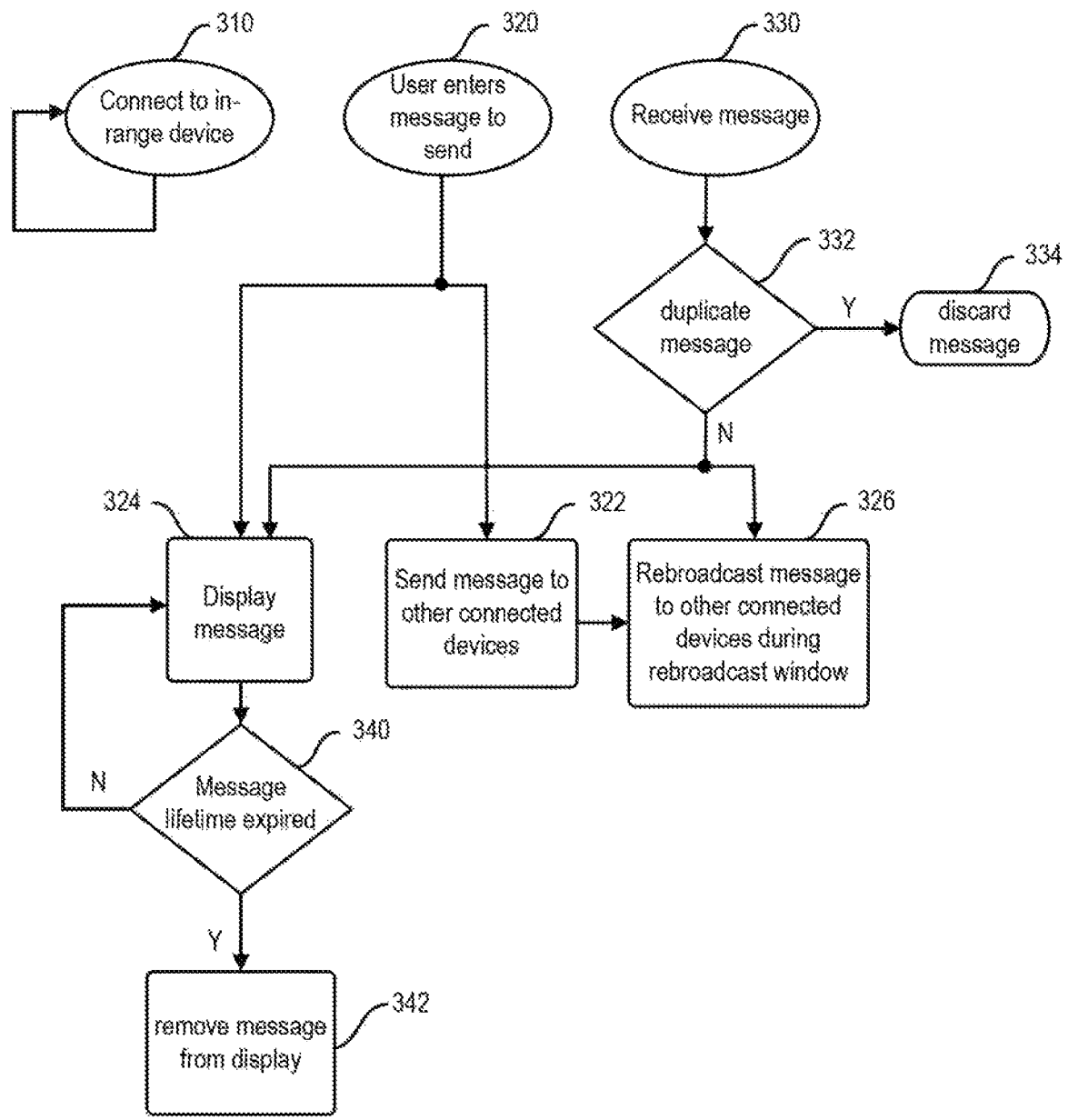
FIG. 3 is a high level flow diagram of a method for distributed messaging.

FIG. 3 shows a high level flow diagram of a method executed in the software of the various devices 110-128 in the network to provide for distributed messaging. Devices will automatically attempt to establish a data transfer connection, such as a master or slave connection, with other devices using the SRWP as the devices come into range (step 310). A given device maintains a list of devices to which it is connected and information related to those connections, such as whether the connection is a slave connection for sending data or a master connection for receiving data.

When a user enters a message to send, such as text, an image, or other type of data, (step 320), the message is transmitted using the SRWP to other connected devices to which data can be sent. For example, a new message can be sent to each of the devices connected by a slave connection.

In addition, the sent message can be displayed (step 324) in an appropriate screen display on the device. While displayed messages will typically be visible on the display 202 of a device, the term "display" encompasses situations in which the item of interest is made available for viewing on the display but cannot be seen by the user because of other material being shown. For example, the message can be displayed a scrollable screen or window but be outside the visible portion of the scrollable content. Similarly, a displayed message could be shown in a window or screen that is hidden beneath a window or screen display of a different application running on the device.

According to one aspect of the invention, outgoing messages are also rebroadcast to connected devices, preferably during a rebroadcast window of time (step 326). For example, an outgoing message can be rebroadcast once every 30 seconds for a rebroadcast period of 5 minutes. Alternatively, messages can be rebroadcast a specified number of times.

Preferably, messages are sent without requiring acknowledgements. This allows for increased bandwidth for data, an advantage when using a SRWP, such as BLE, that typically has limited bandwidth constraints as a tradeoff for power savings and other factors. While there is a risk that the message may not be received, this is lessened by the fact that the target device will have several other opportunities to receive that same message when it is rebroadcast.

When a message is received from a connected device (Step 330), such as via by a master connection, the message is examined to determine whether it is a duplicate of a previously received message (Step 332). If so, the duplicate message can be discarded to thereby filter out messages previously received and processed by the device. (Step 334) Determining whether a new message is the same as a previously processed message can be done using various techniques known to those of skill in the art and at different levels of granularity. In a particular embodiment, messages contain a unique ID or a unique ID is generated based on the message contents. This unique message ID is checked against the message IDs for previously received and processed messages. If there is a match, the received message is a duplicate. If the received message is not a duplicate, it is displayed (step 324). The received message is also queued up for rebroadcast (step 326). As messages are received and rebroadcast, those messages are thereby distributed throughout the various devices connected in the mesh network.

Receipt of a given message can be remembered forever. Preferably, however, the message ID data is only stored for a predefined remembrance lifetime. For example, the system can store message ID data for messages received in the current and preceding calendar day or store message ID data only for a set period of time after receipt of the message.

A displayed message can take various formats. In one embodiment, the message content is text data of a maximum length, such as 160 characters. The message content could alternatively be a longer block of text, or other types of content such as an image, sound file, etc. In addition, a message will typically include a name, icon, or other identifier of the user from which from which it originated. A message display can show a stream of messages in, e.g., a scrolling window, with multiple text messages and the associated user names and icons.

Preferably, messages can have a corresponding display lifetime and a message will be displayed only during its lifetime, after which it is removed from display. (Steps 340, 342). Messages can be removed even if the user has not actually viewed the message contents. For example a message may be displayed in a portion of a display window that has been scrolled off of the visual display. The message will be removed from the display after its lifetime expires even if the user has not scrolled the window to move that message into the visible portion of the window.

In one embodiment, all messages are given a fixed common lifetime such as 5 minutes from receipt. Alternatively, different classes of messages can have different lifetimes. For example, a message that is tagged as very important could have a longer lifetime than a standard message. In addition, the message lifetime can vary based on a class of user. For example, a standard user may be restricted to sending messages that receive a default message lifetime of 5 minutes while a premium user may be able to specify that some or all of its messages be given a longer (or shorter) lifetime.

The content of a message can be deleted from the device after the message lifetime expires. However, since the remembrance lifetime is likely to be much longer than the display lifetime, the corresponding unique message IDs can be stored for a longer period of time to allow the system to continue to reject duplicate messages even though the actual message contents are no longer available.

According to a particular aspect of the invention, a visual attribute of a displayed message is varied over the message's lifetime to provide a visual indication of the remaining lifetime of that message. In one embodiment, the transparency or contrast relative to the background of a respective displayed incoming message is adjusted over the display lifetime of the message so that the message appears to slowly fade over time, disappearing when its lifetime expires. Other visual attributes of a message, such as color, size, or typeface, can also be varied over the messages lifetime.

Figure 4:
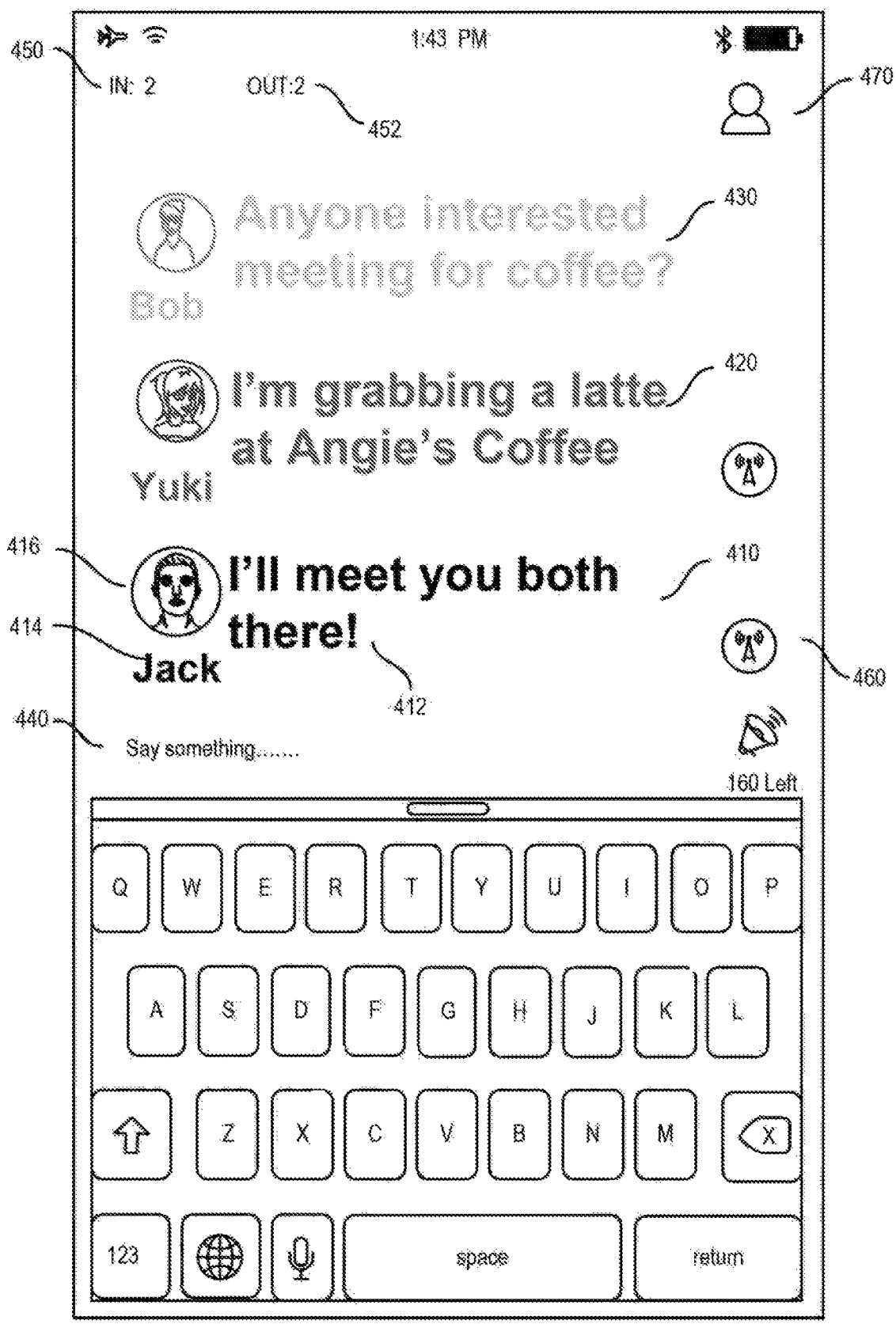
FIG. 4 is a sample screen display of a device showing messages displayed according to aspects of the invention.

FIG. 4 is a representative screen display showing various messages at various stages of their display life. The message 410 is a newly received and displayed message. The display for that message comprises the message contents 412 and the name 414 and an icon 416 associated with the message originator. Message 420 and 430 are older messages, showing for example a fading of 50% and 75%, providing a visual indication that the lifetime remaining for the message is about 50% or 25% respectively.

Various other aspects of a preferred screen display are also shown in FIG. 4. A data input window 440 is provided into which a user can enter a new message. The display can also show the number of devices to which this device is connected. For example, indicators 450 and 452 show, respectively, the number of other devices from which the device can receive data ("In", representing, e.g., the number of master connections from the device), and the number of devices to which it can send data ("Out", representing, e.g., the number of slave connections from the device). While messages are preferably rebroadcast during a rebroadcast window of time, the user can be given the option to manually force a rebroadcast of a selected message that is still being displayed, such as by selecting a rebroadcast button 460. A manual rebroadcast can fully reset the rebroadcast window for the given message or can result in a more limited rebroadcast window. A user profile button 470 can be provided as one way for a user to access functionality to manager their profile and user account.

Returning to FIG. 2, in one preferred implementation, the software application comprises a variety of functional modules. In a particular, exemplary embodiment, the overall management of sending and receiving messages is addressed by top level message manager 216. Incoming and outgoing messages can be stored in a message database 218, in whole or part, including information needed to determine if a duplicate message is received. A broadcast queue 220 can contain messages to be broadcast and a display queue 222 can contain messages to be displayed. The particular manner in which message data is stored can vary. For example, the broadcast queue 220 and display queue 222 can be stored within the message database or separate from it. The display queue 222 can directly represent the data content to be displayed, such as in a window, or be a source of display information used by other display routines that format and configure data in a manner suitable for display.

A device Management and Communication module 224 provides functionality to establish connections to other devices and to manage aspects of receiving and broadcasting/rebroadcasting messages. Functionality can be distributed into sub-modules as may be desired according to the particularities of the SRWP used. Preferably, the functionality of module 224 is performed in two modules. A central manager 226 manages received data to establish connections to peripheral devices and assemble received messages. A peripheral manager 228 manages connections to central devices and also message broadcast/rebroadcast functionality. Information about connected devices can be contained in a connected device database 230, which may be implemented as separate databases or tables of information about connected master devices and connected slave devices. A message display manager 232 includes functionality to vary the display attributes of messages over the message display lifetime. Various message management functionality can be centralized or can be included within at least partially autonomous message objects (discussed further herein) which can include functionality to, for example, insert themselves into broadcast a display queues, adjust their own display attributes, and remove themselves from the display queue after the display lifetime has elapsed. Other software modules can be provided to manage user administration issues 234 and user interface functionality 236.

Figure 5:
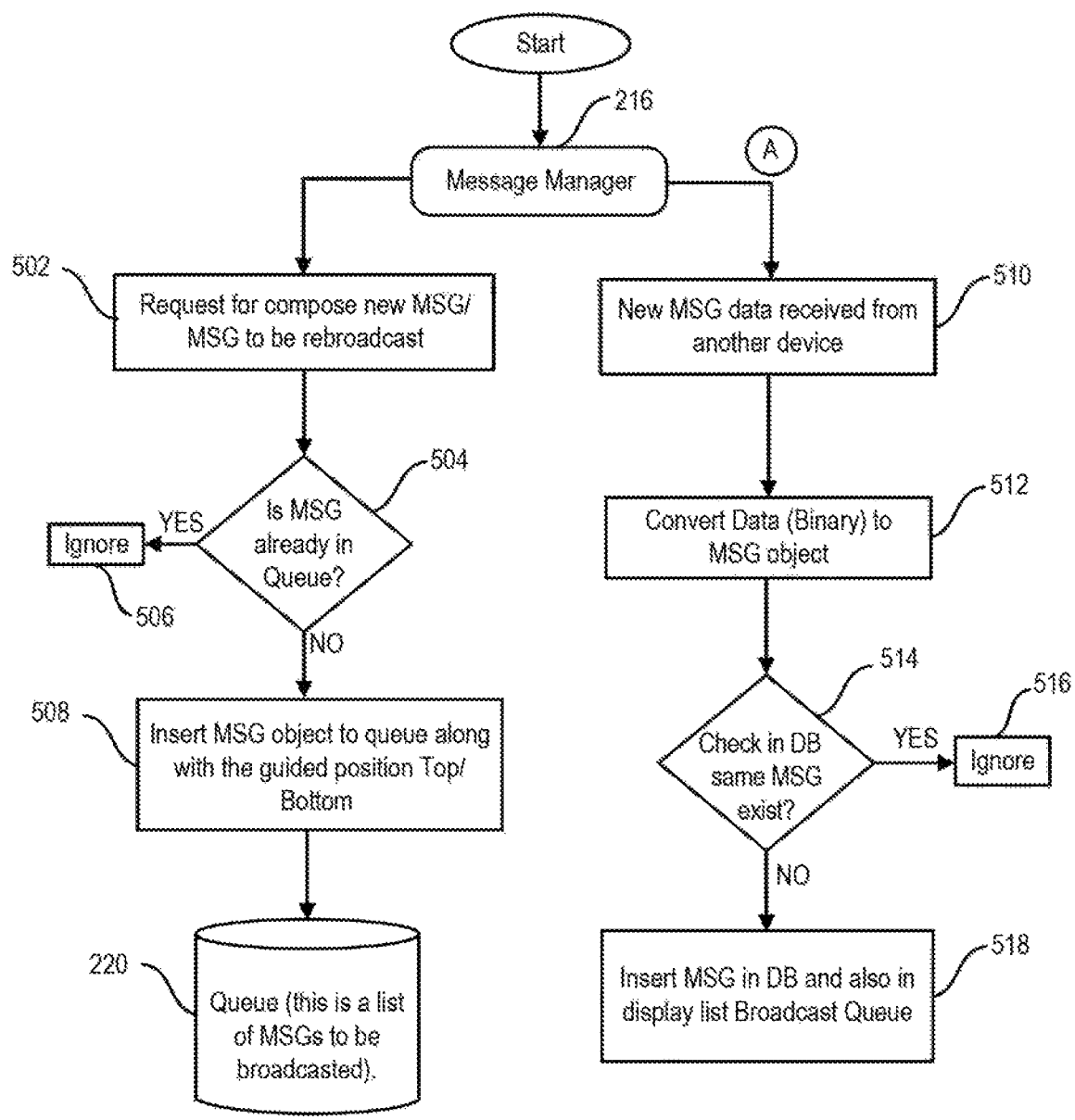
FIG. 5 is a flow diagram of an implementation of a message manager module of FIG. 2.

FIG. 5 is a high level flow diagram of an implementation of a message manager module 216. Block 502 represents a condition when a user has input a new message or indicated a manual rebroadcast of an existing message. If the message is not already in the broadcast message queue 220 (step 504), the message is added to the queue 220 (step 508). Otherwise it is ignored (step 506). Messages can be placed in a position in the queue based on message parameters. For example, if the queue is emptied from top to bottom, a normal message can be added to the bottom of the queue while a high priority message can be added to the top of the queue.

Block 510 represents a condition where a new message is received from another device. The message data can be parsed and converted into a message object as appropriate based on the manner in which messages are stored in the device (step 520). If the received message is not a duplicate of a message already represented in the message database 218 (step 514), the message is added to the message database 218 and can also be added to the broadcast and display queues 220, 222 (step 518).

Figure 6:
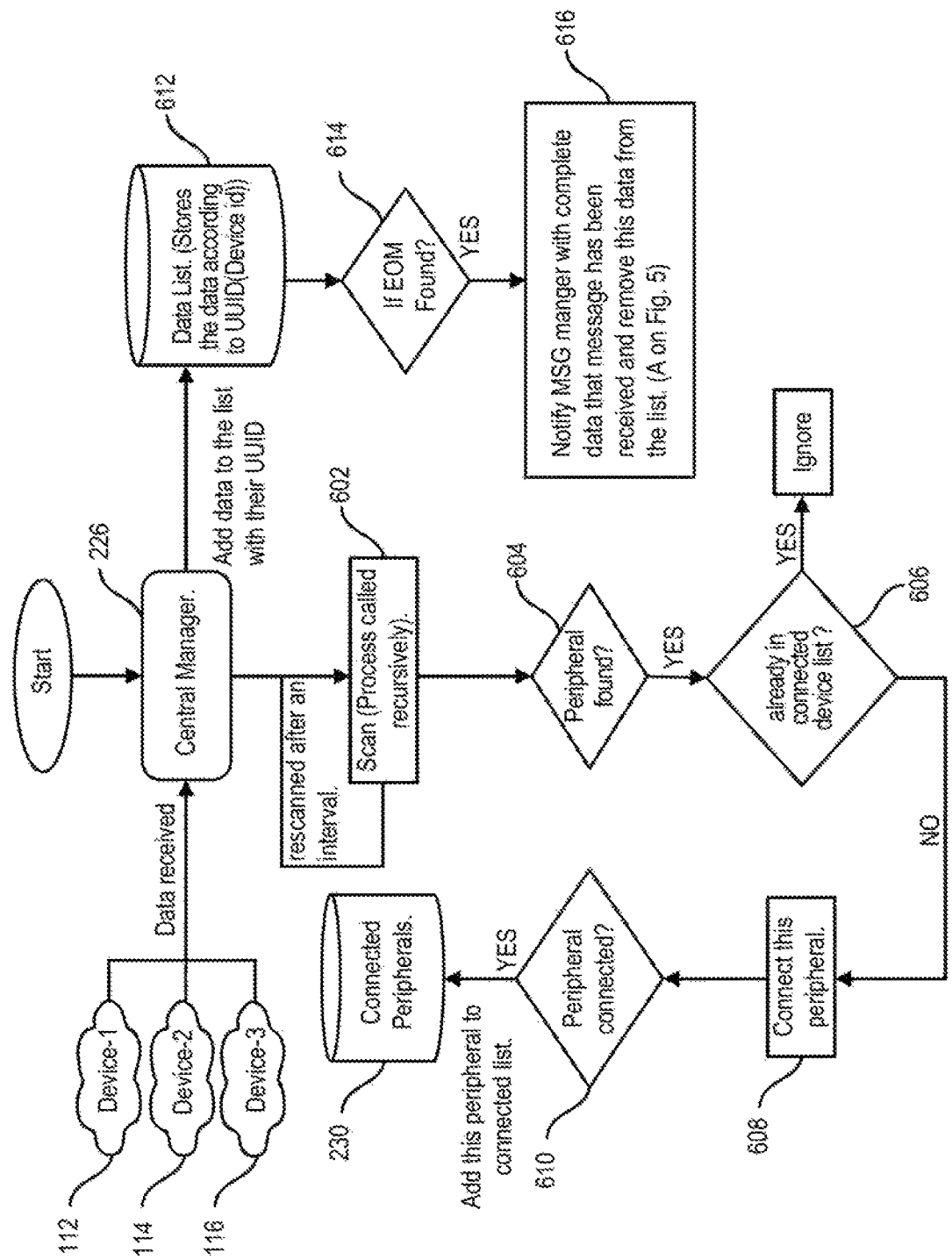
FIG. 6 is a flow diagram of an implementation of a central manager module of FIG. 2.

In a preferred SRWP, such as BLE, the central manager 226 establishes master connections and processes incoming data from slave (peripheral) devices. FIG. 6 is a high level flow diagram of an implementation of a central manager 226. The central manager processes messages received over the SRWP from connected devices, such as messages devices 112, 114, and 116 may send to device 110 in FIG. 1. There are two primary types of received data to process: (i) message data and (ii) advertisements from slave devices indicating that they are available for connection.

To establish connections, the central manager 226 will periodically or continuously scan for received advertisements sent from slave/peripheral devices. (Step 602). If an advertisement is received (indicating that a slave device is available for connection) (step 604) and that device is not already connected (step 606), a connection is established with the new device and information about the newly connected slave device is added to the connected device database 230. (Steps 608, 610).

If received information is from a message, the central manager 226 will process the message data as appropriate and notify the message manager 216 when a complete message has been received. Messages can require more data than can be contained in a single communication in the SRWP and, in such a case, will be sent in chunks that need to be reassembled. When a message chunk is received, that data along with the ID of the slave device from which it came is stored. (Step 612). If an End of Message ("EOM") indicator is present, the complete message associated with that device is assembled from the received associated chunks, data validation performed as may be appropriate, and then the Message Manager 216 is notified of receipt of a new message. (Steps 614, 616). The Message Manager 216 commences processing of the new message at point A in FIG. 5 (Step 510). Assuming that the chunks are sent in order, messages can be assembled on the fly, with newly received chunks appended to the existing data in storage for that message.

In one embodiment, all of the chunks for a given message are received and assembled into the complete message before the message is rebroadcast. In an alternative embodiment, a received chunk can be immediately rebroadcast when received. This alternative may allow for faster propagation of the message over the network with a tradeoff in more complicated bookkeeping of data and an increase in the likelihood that bandwidth will be used to rebroadcast message chunks for messages that might not be fully and successfully received by the rebroadcasting device.

Figure 7:
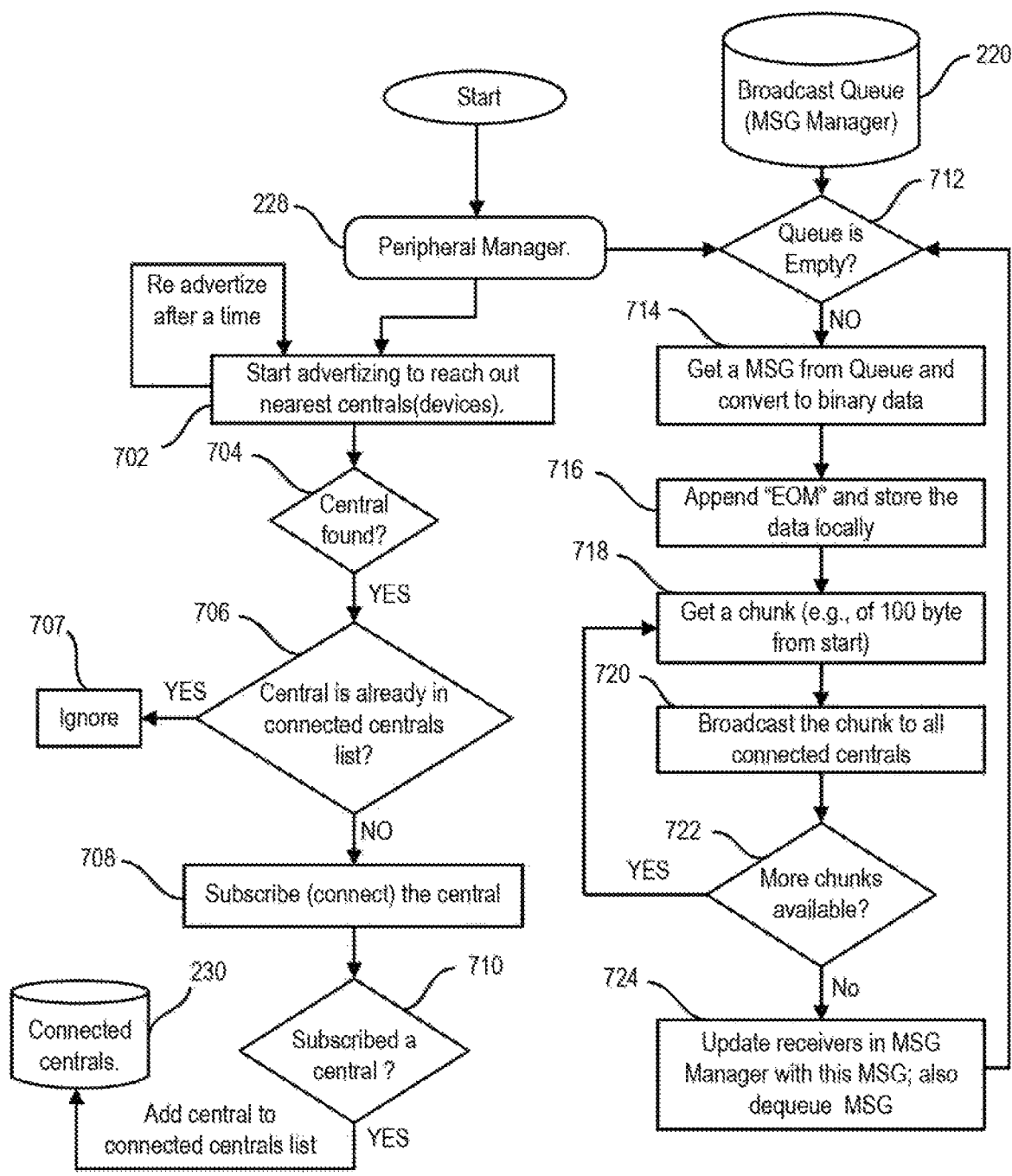
FIG. 7 is a flow diagram of an implementation of a peripheral manager module of FIG. 2.

When using a preferred SRWP, such as BLE, the peripheral manager 228 establishes slave connections and sends outgoing message data to master (central) devices. FIG. 7 is a high level flow diagram of an implementation of a peripheral manager 228. To establish slave connections, advertisements are sent on a continuous, periodic, or intermittent basis. (Step 702). If a central device receiving an advertisement responds with a connection request (step 704) and that device is not already connected as a central device (step 706) then a slave connection to that central device is established and information about the newly connected central device is added to the connected device database 230. (Steps 708, 710).

Messages to be broadcast are contained in a broadcast queue 220. Messages can be added to the broadcast queue 220 by the message manager 216 or, depending on implementation, by a function in a message object. As used herein, referring to a message as being in a queue or database encompasses configurations in which the message is present by means of a pointer to message data stored elsewhere.

If the peripheral manager 228 determines that the broadcast queue 220 is not empty (step 712), a message is retrieved from the queue for broadcast (step 714). The message is then prepared for transmission. If the message is to be sent in chunks, the message data is prepared, including by adding an appropriate EOM indicator (step 716). The message is then sent to each of the connected central devices. Preferably, the chunks are sent in a distributed chunkwise manner wherein each message chunk is sent to each of the appropriate receiving devices, such as the central devices, before moving on to send the next chunk. (Steps 718, 720, 722). Broadcasting/re-broadcast messages in such a distributed chunkwise manner allows each of the devices to which the message is directed to receive the message roughly in parallel and at the same time. An alternative embodiment can send all chunks of the message to one recipient device before starting transmission of the message to the next device. After the message has been sent to the central devices, the message can be removed from the broadcast queue. (Step 724). In addition, various other bookkeeping can be done. For example, if a central device is configured to acknowledge safe receipt of a given message (e.g., all chunks properly received), the software can make note of this so that if the message is rebroadcast, it does not need to be rebroadcast to a (central) device that is known to have already successfully received that message.

Figure 8A:
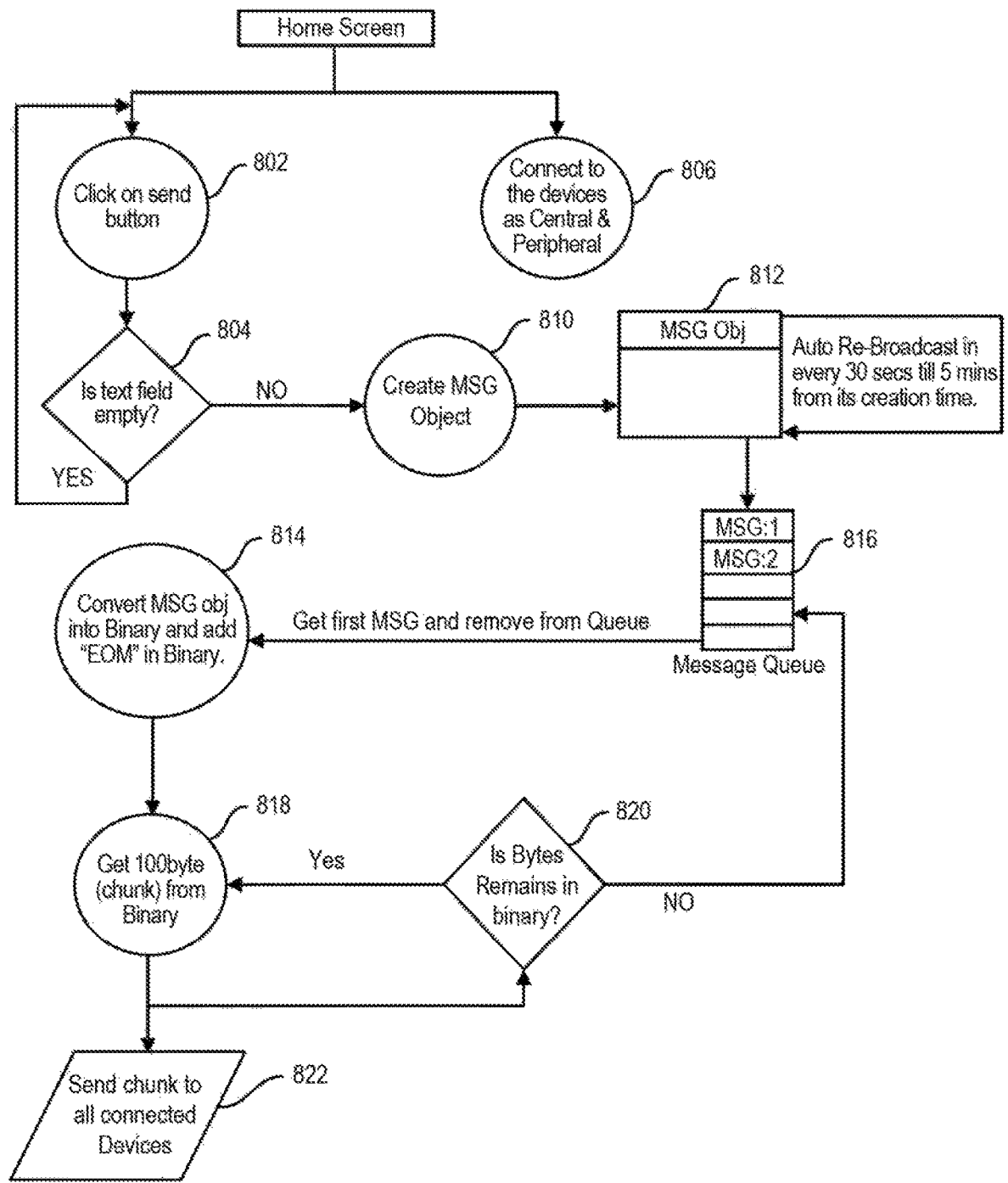
FIGS. 8A and 8B are flow diagrams illustrating aspects of message receipt and rebroadcasting.
Figure 8B:
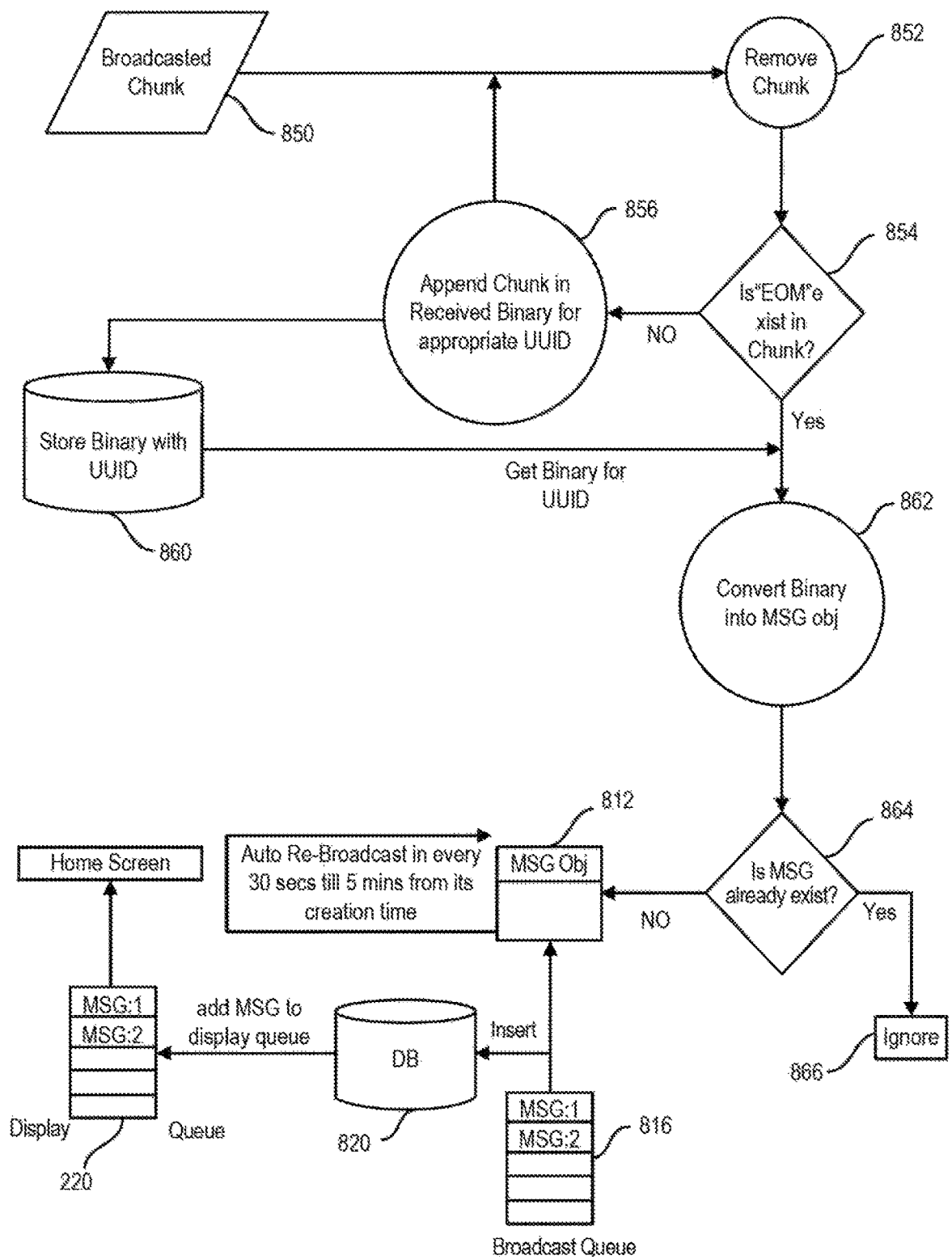

In a preferred embodiment, an outgoing message is rebroadcast for a given rebroadcast period. There are various ways to track rebroadcasts for a given message. In a preferred embodiment, messages are associated with respective message objects. The message object includes functionality that adds its message to the broadcast queue. The message object will persist over time and, periodically over a designated period of time, reinsert its message into the broadcast queue. For example, a message object can add its message to the back of the broadcast queue every 30 seconds for 5 minutes from its creation time. A high level flow diagram illustrating the use of message objects in this manner is shown in FIG. 8A (broadcasting a new message) and FIG. 8B (receiving and rebroadcasting a message).

In an alternative embodiment, a message is placed in the broadcast queue can be given a timestamp or counter. After the message is broadcast, the counter is updated or the timestamp checked. If the message broadcast period has expired and/or the message has been broadcast a requisite number of times, the message is removed from the broadcast queue. Otherwise, the message can be moved to the back of the queue where it will be rebroadcast again in turn.

Figure 9:
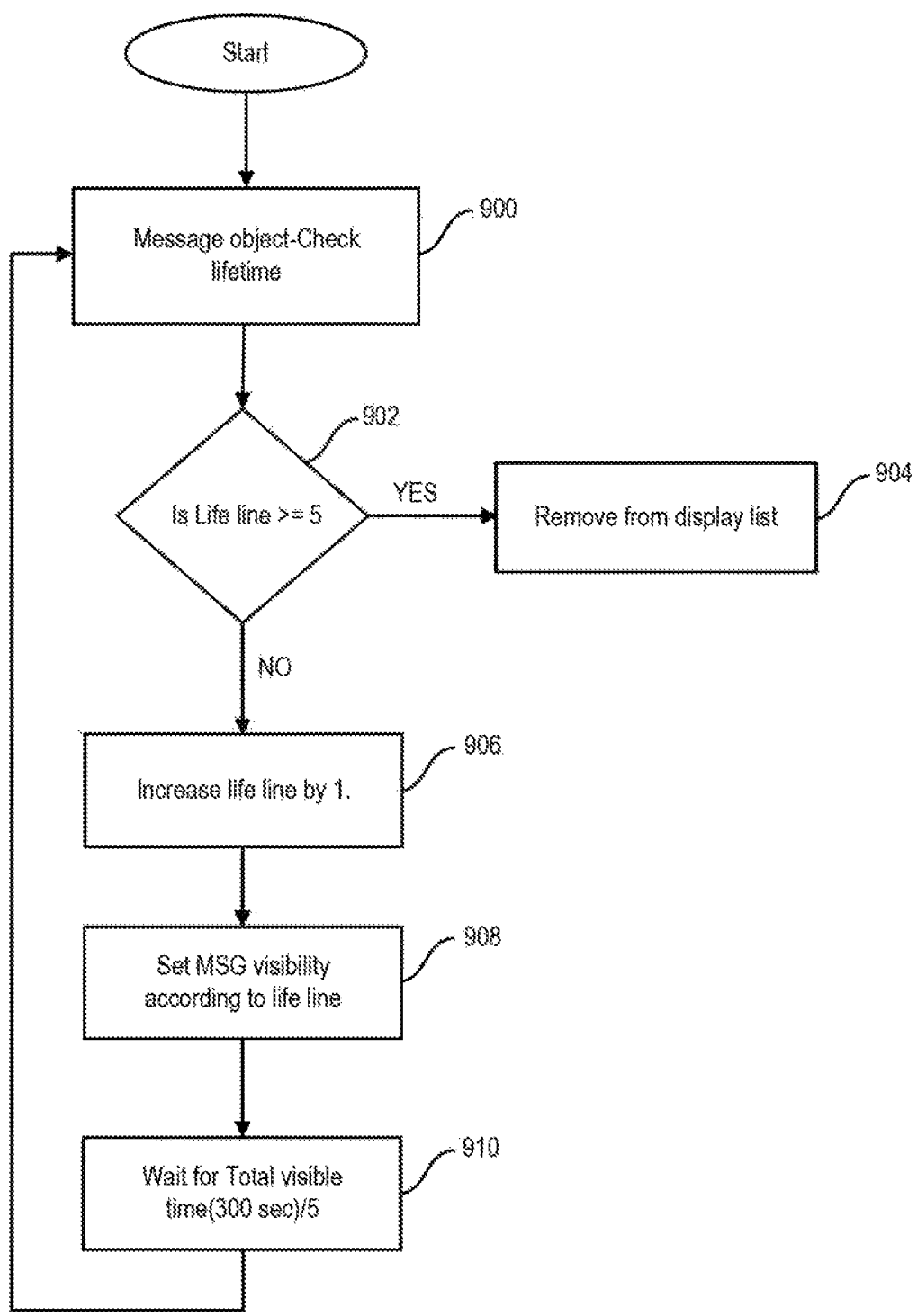
FIG. 9 is a flow diagram illustrating an embodiment for varying a message display attribute during the message display lifetime.

As noted previously, messages are preferably displayed only during a limited display lifetime, after which they are removed from display. In a preferred implementation, message objects are used. Each message object contains a thread that monitors its remaining lifetime. When the lifetime expires, the message is removed from the display queue 222 and the message disappears from the screen. The message object can also alter one or more display attributes of its message during its lifetime. In one implementation, shown in FIG. 9, a message object 900 has a counter (a message "life line") that is increased periodically, with a period based on the total message lifetime and a count threshold. In operation, the message object checks to see if the counter exceeds the threshold. If so, the message object removes the message form the display queue. (Steps 902, 904). Otherwise, the counter is incremented and one or more display attributes of the message are adjusted based on the counter's value. (Steps 906, 908). The message object then waits for a period of time (step 910) and the process repeats.

The delay can be selected based on the total desired lifetime for the message divided by the threshold. For example, if the lifetime is 5 minutes and the threshold is 5, the delay will be 1 minute. Where the display attribute is the message's transparency, the transparency will be changed in a step-wise manner every minute starting from fully opaque and becoming more transparent until the threshold is reached and the message removed from display. By increasing the threshold and decreasing the period of delay, the changes in the messages display attributes may be made smoother. Instead of a counter, the message object can reference a clock or countdown timer. Other embodiments are also possible.

Once a message has expired from display, the message object itself can be deleted. (Unique message ID data can be retained separately as needed to allow rejection of duplicate messages after the display period has expired.)

The contents of messages sent can vary. In a simple configuration, a message will include message text, and one or more data items to identify the original source of the message, such as the message originator's user's ID, e-mail address, etc. Various other types of information can be included as well, such as one or more of (a) a small picture or icon associated with the message originator, (b) information indicating the device II) sending the message (which does not need to be the device from which the message text originated), (c) the device ID for the device from which the message originated, (d) a location, such as GPS data, of the device sending the message, (e) a time stamp, (f) a unique message ID, and (g) a group identifier. Other information can also be included.

In a preferred implementation, a message includes at least the following:

Message_ID—a universally unique message ID.

Text/Data—the actual user message payload.

Owner—information about the originator of the message, such as a user ID. Other information such as a user name and icon that can be displayed with the message can also be included.

Original timestamp—the original creation time/date of the message.

Timestamp—the current time/date for the device sending the message.

Location—GPS data, such as current latitude and longitude of the device sending the message and/or the location of the device from which the message originated.

Is_rebroadcast—a flag indicating if the message is an original message or is being rebroadcast.

Type—an indication of the type of message, such as a message to be displayed or a message that should be processed for other purposes Receiver-ID—indicates the user ID of the user who receives the message at the current time.

Content-type—indicates the type of content being sent, such as text, picture, video, audio, etc.

It will be appreciated that most of the message content would be contained within one or more data packets sent using the SRWP (by means of functionality in various lower layers of the SRWP stack 214). However, some information, such as a device ID of the transmitting device, could be extracted from the data packets generated by the lower level parts of the SWRP and so need not be separately included within the message data itself.

Preferably, each user has a user profile that contains various information related to the user. The type of data that can be included in such a profile includes a user name that can be shown on a display along with messages from that user, an icon or photo that can be shown on or along with messages from that user, an e-mail address, telephone number, a PIN number for use in accessing the software application, and various software settings, such as whether an alert should be issued when a new message is received.

According to a further aspect of the invention, various devices can be placed into groups and messages only displayed on devices being used by members of the specified group. Users can be placed into one or more groups during an initial registration process. In addition, personalized groups can be defined by various users on an ad-hoc basis. For example, a user can define group XYZ on their device and then specify that a message they are sending is for members of group XYZ.

Separate display queues 222 can be used for each group. To support this functionality, the message content can include a group ID field indicating the group with which the message is associated. If a device receives a message for a group in which it is a member, the message could be placed into the appropriate display queue for that group and processed accordingly.

The degree of isolation between various groups can vary depending on how the group functionality is implemented. In one embodiment, the master and slave connections are group agnostic, such that a given master or slave connection is used regardless of which group a transmitted message belongs to and messages are broadcast to connected devices regardless of the group for the message or the groups in which the receiving device is a member. A device receiving the message can either wholly reject messages that are for groups for which the device's user is not a member. Alternatively, while blocking display of an out-of-group message, that message could still be rebroadcast to other devices to allow for a wider distribution of messages even if membership of a specific group is small relative to the network as a whole.

Groups can be further isolated by treating a group as an independent network, with each group having its own separate sets of master and slave device connection to be used in connection with the messages in that group. A user of a device in multiple groups could have multiple slave/master connections to a remote device that is the same groups. Analogously, requests connections can be filtered, such as by connecting only to other devices that indicate they are members of a pre-selected group or meet other specified characteristics.

While distributed messaging between a plurality of computer devices according to the invention can be accomplished using only the SRWP, such as BLE, and without the need for a given device to be connected to the Internet or to communicate with other devices using a different network protocol and system, such as WiFi or cellular data, etc., various additional features can implemented with the use of a backend server that can be accessed using a network other than the SRWP. FIG. 1 shows a server 150 connected to device 110 through a network 152, such as a computer accessible over the Internet. Preferably, server 150 can be generally accessed over the network 150 by any relevant device, such as devices 112-128 (connections not shown) and the manner of connection to server 150, whether by WiFi, over a cellular data network, wired Ethernet, etc., is not critical.

Functions that can be supported by use of a back-end server 150 include initial registration/update for user profile; login authentication when any new user login into device for security purposes and to permit blocking or limiting access to some or all program features for various users; membership management; device backup and synchronization of data, and various other features.

In one example, the backend server 150 is be used to setup and maintain individual user profiles. More robust group membership features can be implemented using backend server 150. For example, a group administrator can limit access to specific groups to a defined set of users and a user would need to access the backend server 150 to obtain access to restricted groups.

The backend server 150 can also be used to synchronize data. For example, when a user connects to the server 150, various configuration information can be uploaded and be then be available for download to another device that may be used by that individual in the future. Synchronization can also be applied to messaging. A message can include an is_synched field. Messages to be synched can be preserved on a device and uploaded to the server 150 when that device next connects. When a different device then connects to the server, the synched messages can be downloaded to that device and processed as if they had been received over the SRWP according to the invention set forth herein. This mechanism can also be used to more easily distribute one or more messages to a given device over the internet, which device would then distribute those messages to the various other devices connected to the SRWP network according to the invention.

As noted above, the message type field can be used to differentiate between different types of messages. The type can be used to indicate the importance or priority of a given message and other attributes which can be taken into account when setting the display lifetime, visual display attributes, rebroadcast period, and/or other attributes related to message processing.

The message type field can also be used to indicate that a message is not a message be processed for normal display but instead is a message requiring other action or different processing than normal. One alternative message is a request for information. The processing of an information request message depends in part on the type of information being requested and the purpose for such request. One type of information request could seek specified information from all of the other members of the network. A device receiving such an information request message would, in response, generate and broadcast a responsive information message containing the requested information and also rebroadcast the information request message itself. Other devices would receive the (rebroadcast) information request message and generate their own responsive information message. The various responsive information messages generated by the devices would propagate across the network and eventually would arrive at the device that set the initial information request message. The initiating device could then collect information from responsive messages that it received and then use that data as appropriate.

In a particular embodiment, an information request message comprises a location request. A device receiving a location request message would rebroadcast that message to other devices in a manner similar to user messages and would also generate and broadcast a response message containing its device location and optionally other information about the device or the user associated with that device. Sending a location request message would thus result in each of the other devices in the network generating a responsive message containing their location. These messages would eventually be broadcast or rebroadcast to the initiating device. The initiating device can then process the location and other data it has received in a given period of time after sending the initial request and present the location data to the user. In a preferred embodiment, the location of the various responding devices is presented graphically on a sonar or radar-type display showing the position of the various responding devices relative to the source device. The location for devices can be displayed and updated as the location data is received. Alternatively, the initiating device can wait for a predetermined period of time to allow the request and responsive messages to propagate through the network, and then display the received information all at once.

According to a further aspect of the invention, a relay device 1000 can be provided to communicate with user devices (such as devices 110-128 of FIG. 1) using various aspects of the communication methods and systems of the invention discussed herein, for example via Bluetooth Low Energy (BLE) or other SRWP as well as with other types of devices using different communication protocols.

A relay 1000 can serve multiple functions. In one, relay 1000 establishes data connections, such as master and slave (central and peripheral) data connections, with other devices communicating according to aspects of the invention. The relay can receive messages sent from other devices and then rebroadcast them. The relay can include a higher power transceiver than typical mobile devices and so extend the range of the mesh network.

The relay 1000 can also connect to a remote data source through a secondary data connection, such as a wired or wireless internet connection or cellular modem, to allow for additional messaging functionality and management. Among such additional message functionality is the ability to provide the relay, through the secondary data connection, with one or more messages to be injected into a mesh communication network established using the SRWP according to aspects of the present invention. The messages can be broadcast upon receipt by the relay 1000 or they can be stored in a message library along with additional data, such as trigger conditions indicating when the relay should inject the message into the network, under what local and external conditions, and to which classes/groups of devices.

Figure 10:
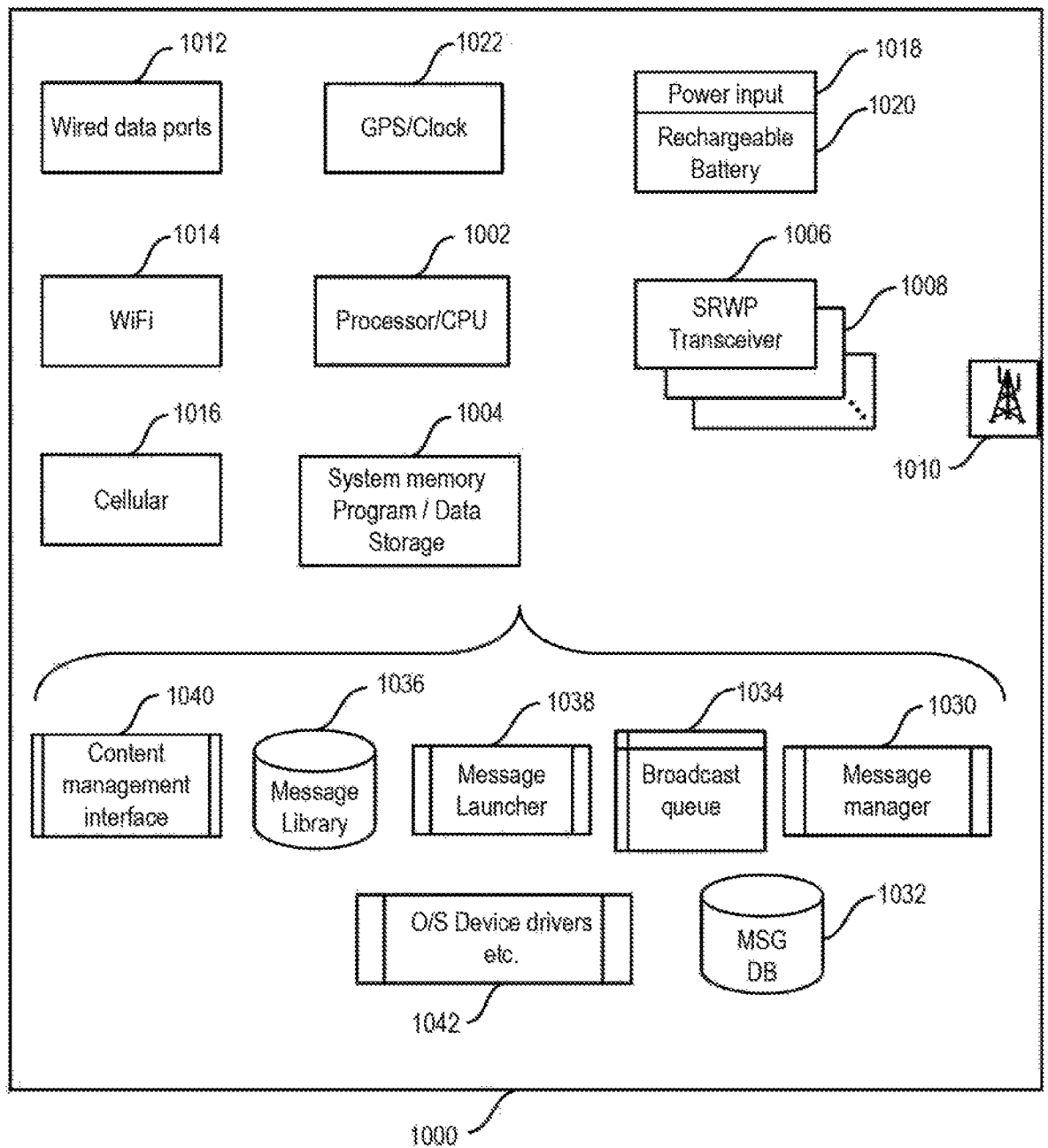
FIG. 10 is a high level block diagram of one embodiment of a relay.

FIG. 10 is a high level a block diagram of one embodiment of a relay 1000 according to aspects of the invention. The relay 1000 comprises a processor 1002 and system memory 1004 for storing software and data. Various software modules and data stores are discussed herein. In addition, conventional lower level SRWP interface functionality, such as the SRWP communication program stack, various device drivers, and operating system software is also provided 1042.

Relay 1000 can communicate with other devices according to aspects of the invention using one or more SRWP radio transceivers 1006, 1008, etc. The SRWP radio transceivers 1006, 1008 can be Bluetooth transceivers that support the Bluetooth Low Energy communication protocol defined in the Bluetooth 4.1 specification. Including multiple transceivers 1006, 1008 allows the relay to handle multiple connections simultaneously, as opposed to being able to communicate over multiple BLE connections but having to alternate among them as needed when only one transceiver is used. Various ways to configure use of multiple transceivers are available. In one embodiment, one SRWP transceiver is used all for master (central) communications while a second SRWP transceiver is used for slave (peripheral) communications.

The SRWP transceivers 1006, 1008 can operate though an antenna internal to the relay (not shown). Preferably, an RP-SMA antenna coupler 1010 is provided to which one or more omnidirectional antennas can be connected which, in an exemplary configuration, would give the relay 1000 a SRWP range of about 20 to 70 feet. A directional antenna can also be provided. Depending on the antenna configuration and transceiver power, this could permit SRWP communication up to a range of a mile. In a specifically preferred implementation, the SRWP transceiver has a maximum output power of about 18 dBm and an input sensitivity of about—94 dBm. Indoor omnidirectional antennas with a gain of about 3 dBi and outdoor of about up to 9 dBi can be used. A directional antenna will preferably be one with a gain of about 18 dBi. Various transceiver and antenna configurations will be known to those of ordinary skill in the art. When the relay is used for proximity communication applications, a limited well defined communication range may be preferred.

In addition to communication through the SRWP, the relay 1000 can include one or more alternative communication links through which it can receive and send data. These other links can include one or more of wired data ports 1012, such as an RJ45 or RS232 interface, wireless data connections 1014, such as an 801.11 ac/b/g/n WiFi transceiver, and a cellular modem 1016 which can allow data communication through cellular networks using, e.g., 4G/LTE and which can also have an assigned cellular number to permit, e.g., sending and receiving texts. These additional networks also allow the relay 1000 to be easily accessed by an administrator or other remote user not connected to the SRWP network. The wired data ports 1012 can also include local data ports, such as USB ports, to which peripheral devices can be attached. Examples of peripheral devices include temperature, humidity, pressure or other types of sensors, as well as other devices such as cameras, audio recorders, and thermostats.

The device can be powered through an external power source, such as the electrical grid of a facility or vehicle, connected to a power input 1018. In addition, or alternatively, the relay can be powered by a rechargeable battery 1020. This both allows the relay to continue operation for a time if external power is cut off and also is useful for relays which are not in a fixed location (such as a relay mounted in a vehicle) or a location with inconsistent power (such as for a relay which may be frequently relocated or is powered using solar or other means). Preferably, the power supply is a rechargeable Lithium Polymer battery with a capacity of about 1000 mAh or higher and a 2 amp 12V DC external power supply. When operating on battery power, the relay may need to operate in a low-power mode with limited functionality.

The relay can also include a real time clock 1022. The clock can be a stand-alone component or integrated with other system devices, such as a GPS unit. A GPS unit is particularly useful for relays that are not permanently installed in a fixed location.

In a preferred configuration, the relay 1000 is contained in a small housing, such as a housing with dimensions of about 100 mm×80 mm×20 mm and includes mounting flanges. A water and weather resistant housing can be provided for relays that may be used in areas exposed to the elements.

Figure 11:
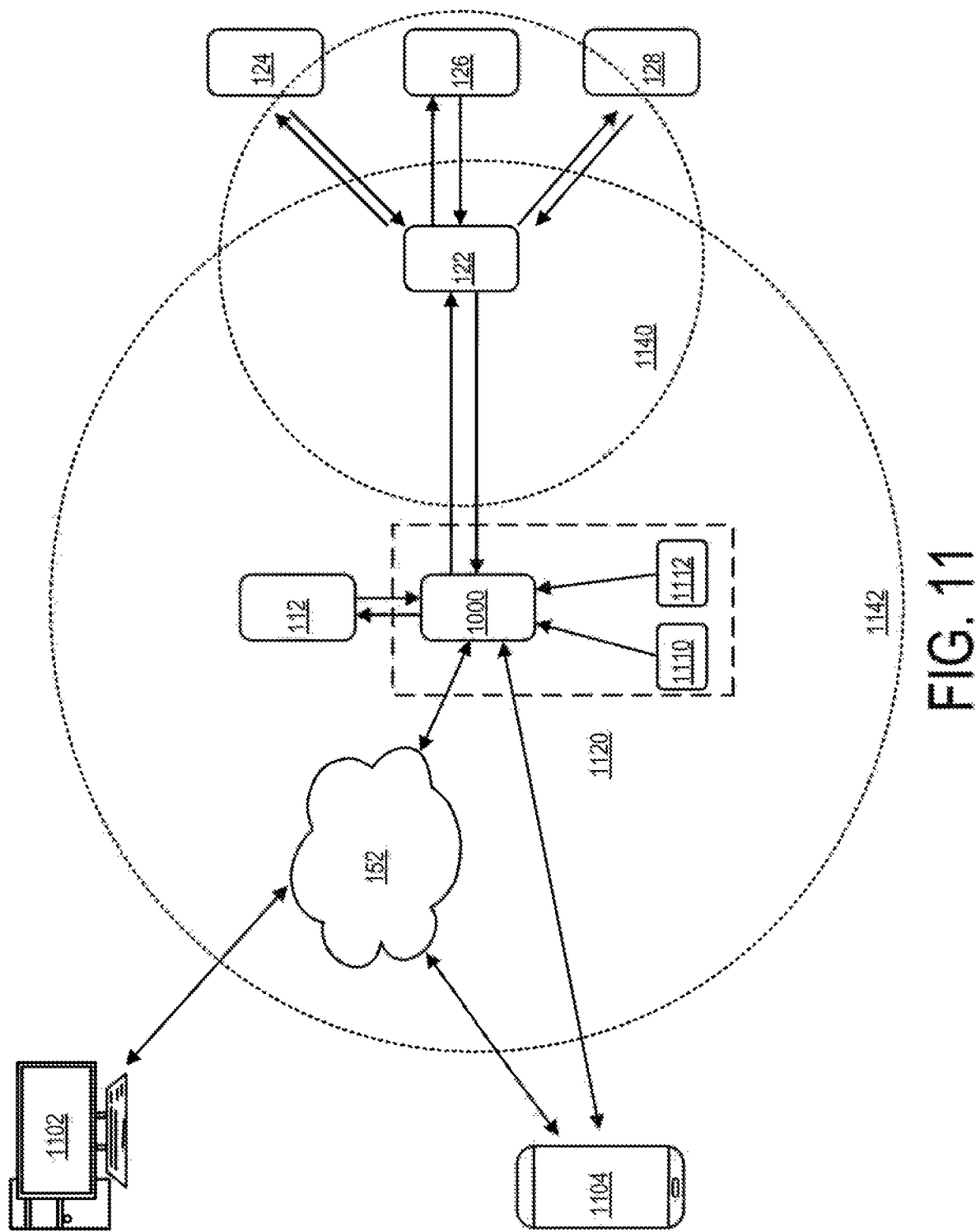
FIG. 11 is a high level diagram showing a network of devices including a relay according to aspects of the invention.

FIG. 11 is a high level diagram showing a network of devices including a relay 1000 according to aspects of the invention. The relay 1000 is connected to various user devices 112, 122 using the SRWP discussed above. As shown, the SWRP in device 122 has a range indicated by circle 1140 while the relay 1000 has a larger range indicated by the circle 1142. An administrator or other user can access the relay 1000 using a computing device 1102, such as a PC or tablet computer 1102 or other a computing device 1104, such as a cell phone or tablet device. Connections to the relay can be made via the network 152, such as the Internet, or using a cellular network, WiFi, or other secondary data network to the relay 1000. In addition, various sensors 1110, 1112 can be connected to the relay 1110. The relay 1000 can be installed in a variety of fixed or mobile environments 1120, such as (i) inside or outside of a building such as a store, convention center, or stadium, (ii) in a vehicle such as a car, bus, train, boat, (iii) on a sign or billboard, or (iv) any other location.

With respect to the functionality of the relay 1000, in a particular exemplary embodiment in which the SRWP is BLE, the overall management of sending and receiving messages to other devices via the SRWP according to the aspects of the invention is addressed by top level message manager 1030 which operates with various subsidiary software modules for establishing and managing central (master) and slave (peripheral) connections to other devices, receiving messages over the central connections and sending messages over the slave connections. The message manager and these subsidiary modules also include functionality to coordinate message transmission and reception through multiple SRWP transceivers 1006, 1008. Communication from the relay to other devices using the SRWP according to the present invention can be implemented in largely the same as manner as for discrete user devices, such as cell phones, tablets, and laptop computers as discussed separately herein and with respect to FIGS. 1-3, 5-7, 8A and 8B (but without a need to display messages).

Incoming messages can be processed and stored in a message database 1032 that contains information about messages received by the relay 1000 via the SRWP from other devices. This information can be used, for example, in determining whether or not received messages are duplicates and should be filtered out instead of being processed for rebroadcast. A broadcast queue 1034 can be used to indicate the set of messages which the message manager 1030 should rebroadcast for a given period of time to devices connected over the SRWP according to aspects of the invention.

In addition to the functionality allowing receipt and rebroadcast of messages over the SRWP from connected devices, the relay 1000 also preferably includes additional functions that permit it to inject messages into the SRWP mesh communication network, either on demand or when one or more given trigger conditions are met.

Messages to be sent upon receipt by the relay can be processed in a manner akin to the transmission of messages entered by a user of a device running the app (e.g., device 112 etc). Messages to be sent from the relay can be standard messages, such as a text, image, video message, etc, or functional messages such as for data collection. For example, the administrator can instruct the relay to send a location request message to the users in the SRWP network encompassing the relay. The relay would collect the identity and location of the responding devices and then make that information available to the administrator. The administrator can also connect to the relay and retrieve other information which may be stored by the relay, such as sensor data addressed below.

The messages which are not broadcast upon receipt by the relay can be stored in a message library along with additional data, such as trigger conditions indicating when the relay should inject the message into the network, under what local and external conditions, and to which classes/groups of devices. Likewise, the relay can receive messages from nearby users and store them for rebroadcast to other users who approach the relay in the future. These additional messages and the associated triggers can be predefined and stored in a message library 1036. These trigger conditions can be monitored by a message launcher 1038. When a message trigger condition is met, the message launcher sends the message. A message to be sent by the message launcher 1038 can be processed in a manner similar to the way a standard (non-relay) device would handle a message entered by a user.

Various trigger conditions can be defined. For example, a trigger condition can specify that a given message should be sent at a specified time or sent only during a given time window. Broadcast conditions can also be specified. For example, a message can be defined to be first sent and then continually rebroadcast every X minutes during a specified time range. In another example, a message can be sent only within a given time period but also when other conditions are met. For example, a message can be triggered to broadcast whenever a new device is connected to the relay. In a further example, a message can be sent only when a minimum number of users are connected to the relay at the same time. In a further example, a trigger can be based on location and a message sent when the relay (mounted in a vehicle or other movable platform) is in a specified location. In yet a further example, incoming SRWP messages can be monitored and a message from the message library broadcast when a received message contains specified text or other data. In addition, the relay can send messages directed to all connected users or broadcast messages only to a designated group.

If peripheral devices, such as sensors, cameras, etc. are connected to the relay (such as through a wired data port 1012 or other input), the relay can be programmed to monitor the data from one or more peripheral devices for the existence of certain trigger conditions and send a message to nearby users when determined conditions are detected. For example, a message can be sent if a sudden change in environmental conditions is detected. In addition, in a manner akin to processing a location detection message, user devices can send a 'sensor check message' which can be processed by receiving devices, such as a relay, and data from connected peripheral sensors or other devices returned. (Such peripheral devices can alternatively be themselves programmed to communicate directly over the mesh network if they can support communication over BLE or other SRWP.)

The message launcher 1038 can monitor the various trigger conditions and control the launching of messages. In an alternative configuration, the trigger monitoring can be distributed. Messages can be defined as message objects. Each message object monitors its own respective trigger conditions and, when the trigger conditions are met, the message object inserts itself into the broadcast queue and removes itself from the broadcast queue as appropriate.

Messages sent by user devices or a relay can include meta-data that instructs a receiving device to process the message in manner that can differ from standard messages. For example, a message can include a flag indicating that a receiving device should not rebroadcast the message to other devices. This flag will allow receipt of messages, such as a message sent from a relay 1000, to be limited to devices within range of the message originator. Alternatively, the message can be configured as a limited rebroadcast in which the number of rebroadcast hops is limited. For example, a message can be limited to a single hop in which a device receiving the message can rebroadcast it to other devices but a device receiving that rebroadcast would not further rebroadcast it to other devices. The number of remaining rebroadcast hops can be contained in a counter in the message which is decremented for each new rebroadcast.

A message from a relay 1000 or other device can also include additional functionality or settings that differ from the standard messages. For example, while a standard message received from a device user may be rebroadcast by the relay 1000 for a relatively short period of time, such as 10 minutes, a message initiated by the relay 1000 may have a custom rebroadcast period defined during which the relay itself will continue to rebroadcast the message. Thus, for example, the relay could be configured to send a message starting at 9 am and rebroadcast it every 30 seconds until 12 pm. In another example, a relay could be configured to broadcast a message every time a new device comes into range of the relay and for 2 minutes thereafter.

A content management interface 1040 can be provided to allow authorized users to add messages, message triggers, and other message definition and control data to the message library 1036, as well as modify and delete existing data. In one embodiment, the content management interface 1040 can be accessed using editor software that is installed on a user device, such as an ipad or other tablet. The user device can connect to the relay using any suitable connection, such as a wired or wireless connection over the internet, via a cellular data connection, etc. The user can then add, delete, and modify messages and their attributes for the relay 1000. Alternatively, content management interface 1040 can provide user access to these functions via an internet web page interface (accessible through, e.g., the wired or wireless connection 1012, 1014). In a simple embodiment, messages can be provided to the relay via a cellular text-message interface in which a message to be sent from the Relay is simply texted to the phone number associated with the cellular modem 1016. To support a relay management connection made using the SRWP, the message manager 1030 and other software includes functionality to detect that a relay control connection is being established and to process those communications separately from standard SRWP messages according to the general aspects of the invention.

A remote server can be provided through which a user can define the messages for multiple relays. The server can contain a copy of the message library for one or more relays. After the user has completed defining the messages, the server can then send distribute the message library updates to each of the respective relays. Alternatively, the relays can be programmed to access the message library remotely.

A relay 1000 combined with smart devices (e.g., device 112, etc.) that communicate with themselves and the relay 1000 using a SRWP as disclosed generally herein can be programmed for use in a wide variety of applications. Several of these are addressed herein.

A relay 1000 can be used as part of a digital graffiti system. When a user of the app is within range of a relay 1000, the application can allow the user to send a specific type of message referred to as a graffiti message. A relay receiving a graffiti-typed message can store the message internally and then rebroadcast it to all users who come within range of the relay 1000. Individuals receiving the graffiti message when they are near the relay can be shown the graffiti message itself (text, video, audio, etc.) as well as other data such as the user's profile picture, user name, and when the graffiti was left.

In a very particular embodiment, graffiti message functionality is coupled with camera image capture functionality in the app on the user's smart device. When a user is within range of a graffiti-enabled relay and opens a camera view, the existing graffiti messages stored on and sent from the relay at that location can be shown to the user superimposed on the background image captured by the camera. The user can then enter their own graffiti message which will subsequently be sent to the relay and stored. An app receiving a graffiti-tagged message can provide a special signal, such as an audio, graphical, or text output, indicating to the user that there is nearby graffiti relay which can accept graffiti messages and also whether or not there are existing graffiti messages that can be viewed.

A relay can store graffiti messages in perpetuity or until the graffiti message is deleted from the relay, such as by an administrator or the initial poster. Alternatively, graffiti messages can be given a fixed lifetime after which they will automatically be deleted by software in the relay. In a further embodiment, the age of a graffiti message can be provided by relay or determined by an app in the receiving device and used to adjust how the graffiti message is displayed to the user. For example, in a manner similar to fading of normal messages over time (see FIGS. 4 and 9), a very old piece of graffiti can be shown in a faded form.

Each relay can periodically upload or otherwise make graffiti messages available to a remote service, such as server 150 of FIG. 1, for remote viewing on a website or app through a map function. OPS data in in the graffiti messages can be processed so that the graffiti messages left at specific locations can be shown overlaid on a map or satellite image.

A relay 1000 can be installed in a vehicle. The relay can be configured to broadcast different messages to passengers on the vehicle depending on the time and/or the location of the vehicle. The messages can be limited to a specific group, such as the vehicle passengers. Passengers could subscribe to the group for their vehicle when entering. One exemplary vehicle is a tour bus.

A relay 1000 installed in a store or restaurant can be programmed to send messages promoting various products or specials throughout the day. Different messages can be defined to be sent during different times of the day. The messages can be sent to users who pass within range of the relay and connect using the SRWP messaging software according to the aspects of the invention. The messages from the relay can be flagged to not be rebroadcast so that they are received only by users within range of the relay. Use of relays in this manner can provide hyper local customized broadcasting and proximity advertising technology which is less expensive, easier to operate, and faster to implement than alternative technologies.

A relay 1000 can be installed at a billboard, such as one in a sports stadium, park, or other public gathering place. An advertising message can be uploaded to the relay through a cellular modem or other data connection assigned to the billboard. Users with smartphones and other devices running the SRWP messaging software according to aspects of the invention will receive that digital ad broadcast via the SRWP when they come in range of the billboard. If the message is not configured to prevent rebroadcast, users will also receive the message when they are within a mesh network where at least one member of the network has received that message. In either case, the messages will be received by users within the general proximity of the billboard.

One or more relays can be placed throughout an area that has no or limited cellular and/or internet access. For example, relays can be placed throughout an underground mine. The relays are used to transmit messages between users underground and to users above ground. The relays may also be used to detect users' locations underground. Similarly, relays can be placed throughout a cruise ship. The relays are used to help transmit messages between passengers and help staff monitor passenger activity for public safety purposes.

Relays 1000 can be used to identify the indoor position of users. A relay can monitor user messages sent using the SRWP according to the invention and extract location data included in the messages. Alternatively, the relay can poll the location of users by sending a message having a type field that instructs receiving devices to respond by broadcasting a message with specified information, such as the location of the receiving device. A device receiving such an information request message would, in response, generate and broadcast a responsive information message containing the requested information. The receiving device could also rebroadcast the information request message (if the message is not flagged to prevent this). Other devices would receive the (rebroadcast) information request message and generate their own responsive information message. The various responsive information messages generated by the devices would propagate across the network and eventually would arrive at the device that set the initial information request message. The initiating device could then collect information from responsive messages that it received and then use that data as appropriate.

Relays can also be used to take a roll call to determine if any miners, passengers, or other members of a group are missing. Similar to a location request message, a message type setting can indicate to receiving devices to generate and broadcast a message indicating that they are present (in the network) and containing their user ID and possibly other data. The roll call request message will also be rebroadcast, resulting in other devices in the network generating their own 'present' message. The roll call request and responsive present messages will be propagated throughout the mesh network. The relay can monitor the present messages that it receives from the various devices and generate an output message, perhaps to a specified sub group, listing the broader group members from which a present response was not received.

A relay and smart device application can also be used in various types of gaming applications. For example, a user can use the system herein as part of a proximity based interactive game. A game display can be shown on an indoor or outdoor video billboard and users who are in the same proximity can participate. In a more specific example, in an interactive bingo game, bingo numbers can be shown on a billboard and users can execute a billboard bingo game on the smart phone. A relay transmitter associated with the billboard will broadcast messages indicating, for example, the specific bingo numbers as they are called. If the user is in proximity to the billboard, the app on their smart device can apply the bingo numbers to the bingo card configuration being used. If the user gets a bingo, they can receive an award, such a coupon or discount for goods or services. Because the user would not receive the bingo numbers unless they are in proximity to the billboard, such a game will encourage users to remain in a given location for an extended period of time and return to that location.

A different type of game is a treasure hunt. An initial clue will direct a user to a given location. When they arrive at that location, a local message broadcast (either regular or graffiti) can provide a clue for the next location. Appropriate software on the user's smart device can filter clue messages so that only the next clue in a sequence will be displayed to the user, thus preventing the user from jumping ahead if they pass near a location relevant only later in the game. When a user reaches the end, they can be awarded a prize. Clues can be broadcast in various locations, such as different storefronts in a shopping mall, different exhibits in a museum, or places of interest throughout a city.

Other types of interactive games, such as trivia, are also suitable. Questions can be shown on a billboard or other display. A set of answers can be broadcast to users in proximity to the display from a relay associated with the display. A game app on the user's smart device can be configured to allow the user to select an answer. A variation of this can be used to take a survey of users in proximity to a given location. A question can be presented on the display and each user in proximity can select from a set of possible answers provided in messages broadcast from a transmitter associated with the display. The user responses are broadcast as special messages and then rebroadcast by the various users while the receiver associated with the display monitors and tabulates the responses. The result can then be shown on the display and used, for example, to select from one or more possible outcomes of a video display, such as an alternative ending to a short video, selection of a music video from a list of videos that could be played, etc. The tabulation of answers to survey questions can be performed in a manner similar to that used to collection location of users discussed above with respect to a location request message.

In a different type of gaming application, multiple users can participate in a multi-player game, played by dozens or over 100 users over a large area. Relays can be used to help pass game-related information between the various users. Some simple example games include Hot Potato and Pong. The gaming app can be combined with features such as location determination to identify the location of users nearby. A user receiving the "potato" can select a given nearby user to pass the potato to or chose a direction to send the Pong ball and the app can determine which user is in that direction and direct the ball accordingly. Messages sent from the apps, with the relays helping to convey those messages, can be used to keep all players appraised of, e.g., the location of the hot potato or pong ball. The position of the ball or the potato relative the various participating user can be shown on the user device display and updated over time.

There are various ways in which the software aspects of the invention can be provided to user devices 110-128 and the relay 1000. The relevant software is provided in the form of one or more computer files, such as a ZIP file or self-installing application or EXE file on a computer readable medium, such as a magnetic or optical computer disk, flash RAM, or other suitable medium. The software can be downloaded to the user device from on-line application stores, such as provided by Apple and other companies. The software can also be made available for download directly from other servers on the Internet, including the back-end server 150.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A method for relaying distributed messaging between a plurality of computer devices using a short range wireless communication protocol (SRWP) through which slave devices provide data to master devices, the method executed on a computer apparatus comprising a programmed processor and a SRWP transceiver system, the method comprising the steps of:
 (a) connecting to first and second remote devices via the SRWP transceiver system by (i) establishing with the first remote device both a slave connection pairing with the apparatus and a master connection paring with the apparatus, wherein the first SWRP connected remote device appears to said apparatus on the respective slave connection as a master device and appears to said apparatus on the respective master connection as a slave device, and (ii)
 establishing with the second remote device both a slave connection pairing with the apparatus and a master connection pairing with the apparatus, wherein the second SWRP connected remote device appears to said apparatus on the respective slave connection as a master device and appears to said apparatus on the respective master connection as a slave device;
 (b) receiving a first incoming message from the first SRWP connected remote device via the respective master connection;
 (c) generating for the first incoming message a corresponding first outgoing message; and
 (d) sending the corresponding first outgoing message to the second SRWP connected remote device via the respective slave connection.

2. The method of claim 1, the SRWP transceiver system comprising a first transceiver and a second transceiver, wherein the slave connection pairings are established with the first transceiver and the master connection pairings are established with the second transceiver.

3. The method of claim 1, wherein the first incoming message includes first content and the first outgoing message includes the first content.

4. The method of claim 3, further comprising the steps of:
 storing the first content in a computer memory; and
 sending the first outgoing message in response to connecting to the second remote device.

5. The method of claim 1, further comprising the step of transmitting a particular message in response to a predefined trigger event to a particular SRWP connected remote device using the SRWP.

6. The method of claim 5, wherein the trigger event is a determination that the apparatus is in a specified location.

7. The method of claim 6, further comprising the step of selecting the particular message based on the location of the apparatus.

8. The method of claim 5, wherein the trigger event is a successful SRWP connection of the particular SRWP connected remote device to the apparatus.

9. The method of claim 5, wherein the trigger event is one of a minimum number of SRWP connected remote devices and a time of day.

10. The method of claim 1, wherein the step of sending the corresponding first outgoing message to the second SRWP connected remote device is performed a plurality of times.

11. The method of claim 1, wherein the SRWP is the Bluetooth Low Energy protocol.

12. The method of claim 1, the apparatus further comprising a non-SRWP transceiver, the method further comprising the steps of:
 receiving a second incoming message through the non-SRWP transceiver;
 generating in response to receiving the second incoming message a corresponding second outgoing message;
 sending the second outgoing message via the SRWP transceiver system to the first remote device via the respective slave connection for the first remote device.

13. The method of claim 12, wherein the second incoming message is a location polling request from a computer device and the second outgoing message is a location request instructing receiving devices to generate a responsive message indicating a respective location.

14. The method of claim 13, further comprising the steps of:
 sending the second outgoing message to the second remote device via the respective slave connection for the second remote device;
 receiving from the first and second remote devices respective responses to the second outgoing message, the responsive messages indicating a respective location of the respective responding device; and
 sending the received location information to the computer device through the non-SRWP transceiver.

15. The method of claim 14, wherein the SRWP is the Bluetooth Low Energy protocol.

16. An apparatus for relaying distributed messaging between a plurality of computer devices using a short range wireless communication protocol (SRWP) through which slave devices provide data to master devices, the apparatus comprising:
 at least one computer processor;
 a computer memory;
 a SRWP transceiver system;

a housing having the processor, memory, and transceiver system contained therein;
the computer memory containing computer instructions, that, when executed by the at least one processor, cause the apparatus to:
(a) connect to first and second remote devices via the SRWP transceiver system by (i) establishing with the first remote device both a slave connection pairing with the apparatus and a master connection paring with the apparatus, wherein the first SWRP connected remote device appears to said apparatus on the respective slave connection as a master device and appears to said apparatus on the respective master connection as a slave device, and (ii)
establishing with the second remote device both a slave connection pairing with the apparatus and a master connection pairing with the apparatus, wherein the second SWRP connected remote device appears to said apparatus on the respective slave connection as a master device and appears to said apparatus on the respective master connection as a slave device;
(b) receive a first incoming message from the first SRWP connected remote device via the respective master connection;
(c) generate for the first incoming message a corresponding first outgoing message; and
(d) send the corresponding first outgoing message to the second SRWP connected remote device via the respective slave connection.

17. The apparatus of claim 16, wherein the transceiver system comprises a first transceiver and a second transceiver, the computer instructions configuring the processor to establish each of the slave connection pairings with the first transceiver and establish each of the master connection pairings with the second transceiver.

18. The apparatus of claim 16, wherein the first incoming message includes first content and the first outgoing message includes the first content.

19. The apparatus of claim 18, the computer instructions, when executed by the at least one processor, further cause the apparatus to:
store the first content in the memory; and
send the first outgoing message in response to connecting to the second remote device.

20. The apparatus of claim 16, the computer instructions, when executed by the at least one processor, further cause the apparatus to transmit a particular message in response to a predefined trigger event to a particular SRWP connected remote device using the SRWP.

21. The apparatus of claim 20, further comprising a mobile platform, the apparatus being carried by the mobile platform, the trigger event being a determination that the apparatus is in a specified location.

22. The apparatus of claim 21, wherein the particular message is selected based on the location of the apparatus platform.

23. The apparatus of claim 16, wherein the computer instructions when executed by the at least one processor, further cause the apparatus to send the corresponding first outgoing message to the second SRWP connected remote device a plurality of times.

24. The apparatus of claim 16, further comprising an antenna within the housing.

25. The apparatus of claim 16, further comprising a rechargeable battery within the housing.

26. The apparatus of claim 16, wherein the SRWP is the Bluetooth Low Energy protocol.

27. An apparatus for relaying distributed messaging between a plurality of computer devices using a short range wireless communication protocol (SRWP) through which slave devices provide data to master devices, the apparatus comprising:
at least one computer processor;
a computer memory;
a SRWP transceiver system;
a non-SRWP transceiver system;
a housing having the processor, memory, SRPW transceiver system and non-SRWP transceiver contained therein;
the computer memory containing computer instructions that, when executed by the at least one processor, cause the apparatus to:
(a) connect to a set of remote devices via the SRWP transceiver system by (i) establishing with a first remote device in the set both a slave connection pairing with the apparatus and a master connection paring with the apparatus, wherein the first SWRP connected remote device appears to said apparatus on the respective slave connection as a master device and appears to said apparatus on the respective master connection as a slave device, and (ii)
establishing with a second remote device in the set both a slave connection pairing with the apparatus and a master connection pairing with the apparatus, wherein the second SWRP connected remote device appears to said apparatus on the respective slave connection as a master device and appears to said apparatus on the respective master connection as a slave device;
(b) generate in response to receipt of a first incoming message through the non-SRWP transceiver a corresponding first outgoing message;
(c) send the first outgoing message through the SRWP transceiver system to the first remote device in the set of remote devices via the respective slave connection for the first remote device;
(d) generate in response to receipt of a second incoming message through a master connection with the first remote device a corresponding second outgoing message;
(e) send the second outgoing message to one of (i) a computer device via the non-SRWP transceiver system, and (ii) a remote device in the set of remote devices through the SRWP transceiver system via the respective slave connection with the second remote device.

28. The apparatus of claim 27, the computer instructions that, when executed by the at least one processor, further cause the apparatus to send the first outgoing message to the first remote device in response to a predefined trigger event.

29. The apparatus of claim 28, wherein the first incoming message is a location polling request from a computer device and the first outgoing message is a location request instructing receiving devices to generate a responsive message indicating a respective location.

30. The apparatus of claim 29, the computer instructions, when executed by the at least one processor, further cause the apparatus to:
send the first outgoing message to each remote device in the set of remote devices via the respective slave connection for each respective remote device;
receive responsive messages from responding devices in the set of remote devices via the respective master connection for each responding device, the responsive messages indicating a location of the respective responding device; and send received remote device location information to the computer device through the non-SRWP transceiver.

31. The apparatus of claim 27, wherein the SRWP is the Bluetooth Low Energy protocol.

* * * * *